US010612825B2

(12) United States Patent
Majurin et al.

(10) Patent No.: US 10,612,825 B2
(45) Date of Patent: Apr. 7, 2020

(54) LUBRICANT BLENDS TO REDUCE REFRIGERANT SOLUBILITY

(71) Applicant: TRANE INTERNATIONAL INC., Davidson, NC (US)

(72) Inventors: Julie A. Majurin, Mindoro, WI (US); Daniel A. Strange, La Crosse, WI (US); Daryl Dean Steinke, Stoddard, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 76 days.

(21) Appl. No.: 15/591,375

(22) Filed: May 10, 2017

(65) Prior Publication Data

US 2017/0328618 A1 Nov. 16, 2017

Related U.S. Application Data

(60) Provisional application No. 62/334,152, filed on May 10, 2016, provisional application No. 62/434,907, filed on Dec. 15, 2016.

(51) Int. Cl.

| | |
|---|---|
| *F25B 45/00* | (2006.01) |
| *C10M 171/00* | (2006.01) |
| *C09K 5/04* | (2006.01) |
| *C10M 101/02* | (2006.01) |
| *C10M 105/04* | (2006.01) |
| *C10M 105/06* | (2006.01) |
| *C10M 105/36* | (2006.01) |
| *C10M 105/38* | (2006.01) |
| *C10M 107/24* | (2006.01) |
| *C10M 107/34* | (2006.01) |

(52) U.S. Cl.
CPC .............. *F25B 45/00* (2013.01); *C09K 5/044* (2013.01); *C10M 101/02* (2013.01); *C10M 105/04* (2013.01); *C10M 105/06* (2013.01); *C10M 105/36* (2013.01); *C10M 105/38* (2013.01); *C10M 107/24* (2013.01); *C10M 107/34* (2013.01); *C10M 171/008* (2013.01); *C09K 2205/122* (2013.01); *C09K 2205/126* (2013.01); *C09K 2205/24* (2013.01); *C10M 2203/003* (2013.01); *C10M 2203/065* (2013.01); *C10M 2203/1006* (2013.01); *C10M 2207/2825* (2013.01); *C10M 2207/2835* (2013.01); *C10M 2209/043* (2013.01); *C10M 2209/1033* (2013.01); *C10N 2220/302* (2013.01); *C10N 2230/02* (2013.01); *C10N 2240/30* (2013.01); *F25B 2500/16* (2013.01)

(58) Field of Classification Search
CPC ... F25B 45/00; F25B 2500/16; C10M 105/06; C10M 101/02; C10M 105/36; C10M 107/34; C10M 107/24; C10M 105/38; C10M 105/04; C10M 171/008; C10M 111/02; C10M 111/04; C10M 2203/003; C10M 2207/2825; C10M 2203/1045; C10M 2207/2835; C10M 2203/1065; C10M 2209/1065; C10M 2209/1033; C10M 2203/1025; C10M 2209/1085; C10M 2209/1095; C10M 2209/043; C10M 2209/1023; C10M 2203/065; C10M 2209/1045; C10M 2203/1006; C10M 2205/0285; C10M 2209/1055; C10M 2209/1075; C09K 5/044; C09K 2205/126; C09K 2205/24; C09K 2205/122; C10N 2220/022; C10N 2240/30; C10N 2220/302; C10N 2230/02; C10N 2220/301

USPC .............. 252/68; 62/529; 508/459, 577, 579
See application file for complete search history.

(56) References Cited

U.S. PATENT DOCUMENTS

| | | |
|---|---|---|
| 3,146,602 A | 9/1964 | Swearingen |
| 5,044,166 A | 9/1991 | Wijmans et al. |
| 5,062,273 A | 11/1991 | Lee et al. |
| 5,544,492 A | 8/1996 | Manz |
| 5,636,526 A | 6/1997 | Plzak et al. |
| 5,749,245 A | 5/1998 | Thomas et al. |
| 5,806,322 A | 9/1998 | Cakmakci et al. |
| 6,134,899 A | 10/2000 | Brown et al. |
| 6,457,326 B1 | 10/2002 | Serpente et al. |
| 6,952,938 B2 | 10/2005 | Albertson et al. |
| 7,972,524 B2 | 7/2011 | Robin |
| 8,055,453 B2 | 11/2011 | Wyatt |
| 8,236,194 B1 | 8/2012 | Bredsguard et al. |
| 8,287,754 B1 | 10/2012 | Thompson |
| 8,703,690 B2 | 4/2014 | Van Horn et al. |
| 8,888,898 B1 | 11/2014 | Rice et al. |
| 9,003,797 B2 | 4/2015 | Kontomaris |

(Continued)

FOREIGN PATENT DOCUMENTS

| | | |
|---|---|---|
| EP | 0557796 | 9/1993 |
| EP | 1085077 | 3/2001 |

(Continued)

OTHER PUBLICATIONS

Partial European Search Report, European Patent Application No. 17170509.8, dated Oct. 6, 2017 (20 pages).

*Primary Examiner* — Douglas J McGinty
(74) *Attorney, Agent, or Firm* — Hamre, Schumann, Mueller & Larson, P.C.

(57) ABSTRACT

Compositions, methods, systems, and applications herein are directed to lubricant blends that balance solubility and viscosity of a refrigerant, where in some cases the lubricant blends herein help reduce solubility of a refrigerant. A lubricant blend includes a mixture of two or more different types of lubricants to reduce refrigerant solubility.

16 Claims, 7 Drawing Sheets

(56) References Cited

U.S. PATENT DOCUMENTS

| | | | |
|---|---|---|---|
| 2003/0209688 A1* | 11/2003 | Lee | C09K 5/044 |
| | | | 252/68 |
| 2005/0029488 A1* | 2/2005 | Li | C10M 111/02 |
| | | | 252/68 |
| 2011/0079749 A1* | 4/2011 | Carr | C10M 105/42 |
| | | | 252/68 |
| 2011/0144216 A1 | 6/2011 | Hulse et al. | |
| 2012/0167599 A1 | 7/2012 | Kontomaris | |
| 2012/0292556 A1 | 11/2012 | Van Horn | |
| 2013/0096218 A1* | 4/2013 | Rached | C09K 5/045 |
| | | | 521/170 |
| 2013/0104548 A1 | 5/2013 | Kontomaris | |
| 2013/0104573 A1 | 5/2013 | Kontomaris | |
| 2013/0104575 A1 | 5/2013 | Kontomaris | |
| 2013/0119300 A1 | 5/2013 | Van Horn et al. | |
| 2013/0160478 A1 | 6/2013 | Kontomaris | |
| 2013/0283830 A1 | 10/2013 | Jandal et al. | |
| 2014/0103248 A1 | 4/2014 | Van Horn et al. | |
| 2014/0174084 A1 | 6/2014 | Kontomaris | |
| 2015/0001433 A1 | 1/2015 | Robin et al. | |
| 2015/0252240 A1 | 9/2015 | Van Horn et al. | |

FOREIGN PATENT DOCUMENTS

| | | | |
|---|---|---|---|
| WO | 02/070637 | 9/2002 | |
| WO | 03/044137 | 5/2003 | |
| WO | WO-2015077570 A1 * | 5/2015 | C09K 5/045 |

\* cited by examiner

LUBRICANT BLENDS TO REDUCE REFRIGERANT SOLUBILITY

FIELD

Embodiments disclosed herein generally relate to lubricant blends. In particular, compositions, methods, systems, and applications herein are directed to lubricant blends that balance solubility and viscosity of a refrigerant, where in some cases the lubricant blends herein help reduce solubility of a refrigerant, which may be implemented in equipment of vapor compression systems, such as for example, heating, ventilation, air conditioning, and/or refrigeration (HVACR) systems.

BACKGROUND

Vapor compression devices have load bearing surfaces utilizing a wide range of materials. Lubricants are used on these load bearing surfaces to reduce friction and wear. For example, in HVACR systems, utilizing saturated and unsaturated hydrofluorocarbon (HFC) refrigerants—also referred to as hydrofluoroolefins (HFOs) when unsaturated, may employ a polyol ester (POE) or a polyvinyl ether (PVE) lubricant. A specific lubricant is selected by considering the lubrication requirements of the intended system of use and ensuring that the refrigerant and oil mixture properties meet these requirements. In most cases, one specific class of lubricant, such as for example POE, PVE or polyalkylene glycol (PAG) is selected for a vapor compression system.

SUMMARY

When a new refrigerant and lubricant combination is applied to an existing system design, bearing lubrication requirements (e.g. minimum film thickness) for example of a compressor of a vapor compression system, are considerations to be met for an anticipated operational range of the vapor compression system. In the case of new system builds such considerations are taken into account in the design of the system. While in existing systems, interactions between the new refrigerant and lubricant that are different from the interactions of the refrigerant and lubricant originally present with the designed system can also drive these considerations.

Different modes of operation for a system may have different lubrication requirements. For instance a compressor operating at a slower speed or at variable speeds may require a higher viscosity lubricant than the same type of compressor operating at a single fixed speed with the same refrigerant. In addition, if the refrigerant is replaced in a specific system by an alternative, a different lubricant may be required to compensate for differences in the solubility between the previous refrigerant and the new refrigerant. For example, if a refrigerant has higher solubility in the lubricant, the lubricant is susceptible to lubricant viscosity reduction as compared to a relatively less soluble refrigerant. In such cases, a higher viscosity lubricant can be selected to compensate for lubricant viscosity reduction when present in a mixture of the lubricant and refrigerant. However, using higher viscosity lubricants can require additional power consumption by the system to move the relatively higher viscosity fluid, which can impact system efficiency, for example during a cold start condition. In addition, extra hardware added to the system, for example a lubricant separator and/or lubricant heater, and/or the use of different system controls, can lead to additional concerns including the increase in the cost of manufacture and on component reliability for such additional components. Further, if the system operating map is restricted or reduced due to the refrigerant lubricant interaction(s), product sales may be limited due to the inability to operate under conditions specified by certain customers.

Embodiments disclosed herein generally relate to lubricant blends. In particular, compositions, methods, systems, and applications herein are directed to lubricant blends that balance solubility and viscosity of a refrigerant, where in some cases the lubricant blends herein help reduce solubility of a refrigerant, which may be implemented in equipment of vapor compression systems, such as for example, heating, ventilation, air conditioning, and/or refrigeration (HVACR) systems.

In an embodiment, a lubricant blend includes a mixture of two or more different types of lubricants to reduce refrigerant solubility, for example in comparison to a single lubricant of the same or similar viscosity grade, or to other lubricant blends.

In an embodiment, a lubricant blend composition includes two or more lubricants. The two or more lubricants include a first lubricant; and a second lubricant. The first lubricant is present at a higher weight percentage than the second lubricant, the first lubricant includes a higher viscosity than the second lubricant, such that when blended with the second lubricant, the lubricant blend has a resulting viscosity when mixed with a refrigerant, and the lubricant blend exhibits a suitable miscibility and solubility within a desired operating range of a vapor compression system.

In an embodiment, the lubricant blend includes one or more of POE, PVE, and PAG as the first lubricant and one or more of alkylbenzene (AB), polyalphaolefin (PAO), mineral oil, and estolide as the second lubricant.

In an embodiment, the first lubricant is POE or PVE and the second lubricant is AB or mineral oil.

In an embodiment, the first lubricant is POE and the second lubricant is AB.

In an embodiment, the lubricant blend is mixed with a refrigerant or refrigerant blend.

In an embodiment, the refrigerant or refrigerant blend is a relatively soluble refrigerant type when mixed with a single lubricant. In an embodiment, the refrigerant or refrigerant blend is a low pressure refrigerant type, which includes for example an olefin refrigerant type. In an embodiment, the refrigerant or refrigerant blend is a refrigerant type suitable for use in a chiller, for example a fluid chiller implemented with a centrifugal compressor. In an embodiment, the refrigerant or refrigerant blend is a relatively soluble refrigerant type and is a low pressure refrigerant type.

In an embodiment, the refrigerant or refrigerant blend is a blend of two refrigerants.

In an embodiment, the refrigerant or refrigerant blend includes for example, a blend of R1336mzz(Z) (i.e. cis-1,1,1,4,4,4-hexafluorobut-2-ene) as the first refrigerant and R1130(E) (i.e. trans-1,2-dichloroethylene) as the second refrigerant.

In an embodiment, a fluid for a vapor compression system includes one of the lubricant blends described above and one of the refrigeerant or refrigerant blends described above.

In an embodiment, the vapor compression system is a fluid chiller for an HVACR application.

In an embodiment, the fluid chiller includes a centrifugal compressor.

In an embodiment, a method of retrofitting a vapor compression system includes removing an existing fluid in the vapor compression system, the existing fluid includes a refrigerant and lubricant mixture; replacing the existing fluid in the vapor compression system with a replacement fluid, the replacement fluid includes a replacement refrigerant of one of the refrigerant or refrigerant blends described above and one of the lubricant blends described above; and confirming an operating range of the vapor compression system with the replacement fluid.

A method of reducing the solubility of a refrigerant in a lubricant blend includes selecting a refrigerant of one of the refrigerant or refrigerant blends described above for application in a vapor compression system; selecting one of the lubricant blends described above to be included as a mixture with the selected refrigerant; confirming the miscibility of the lubricant blend and refrigerant when mixed together over a desired operating range of the vapor compression system; and confirming a viscosity of the lubricant blend and refrigerant when mixed together over the desired operating range of the vapor compression system.

DRAWINGS

These and other features, aspects, and advantages of the will become better understood when the following detailed description is read with reference to the accompanying drawing, wherein.

DETAILED DESCRIPTION

Embodiments disclosed herein generally relate to lubricant blends. In particular, compositions, methods, systems, and applications herein are directed to lubricant blends that balance solubility and viscosity of a refrigerant, where in some cases the lubricant blends herein help reduce solubility of a refrigerant in the lubricant blend, which may be implemented in equipment of vapor compression systems, such as for example, heating, ventilation, air conditioning, and/or refrigeration (HVACR) systems.

Figure 1:
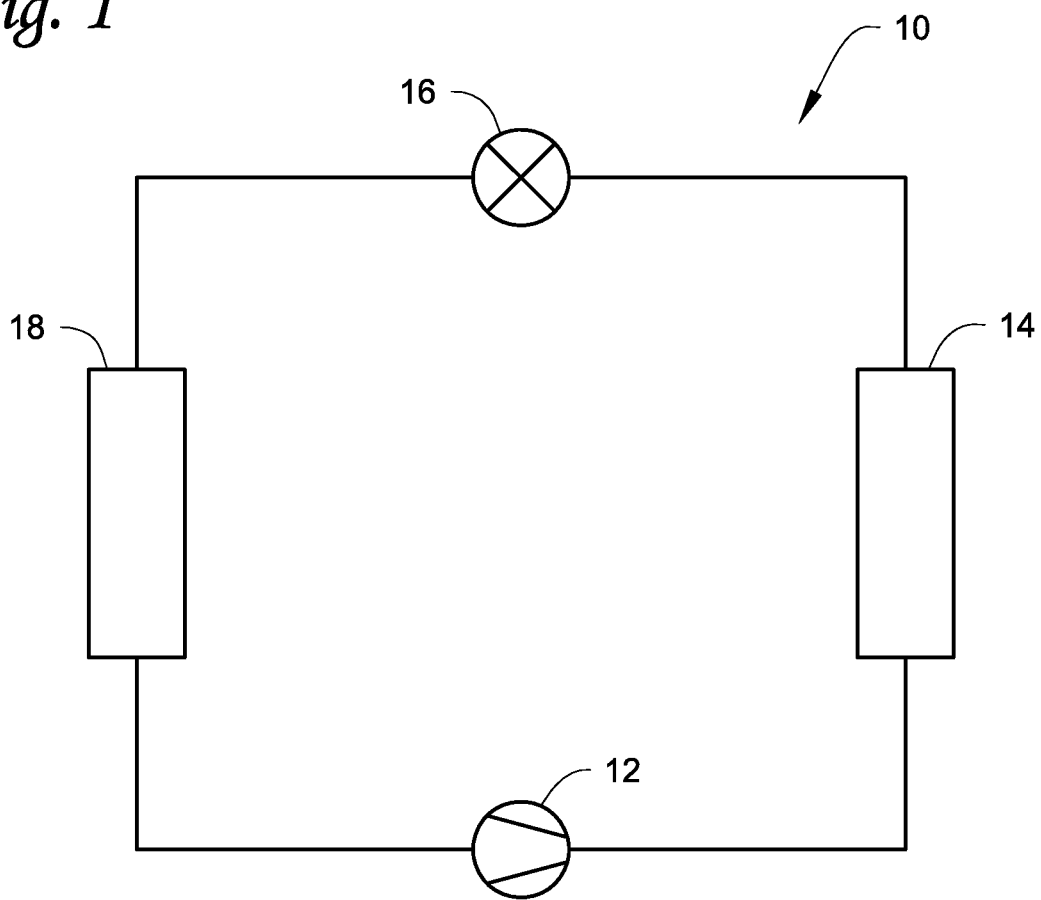
FIG. 1 is a schematic diagram of a vapor compression system, according to an embodiment.

FIG. 1 is a schematic diagram of a heat transfer circuit 10 according to an embodiment. The heat transfer circuit 10 is an example of a vapor compression system, which may be implemented as a HVACR system, such as for example a fluid chiller. In an embodiment, the fluid chiller is a centrifugal chiller, including a centrifugal compressor. The heat transfer circuit 10 generally includes a compressor 12, a condenser 14, an expansion device 16, and an evaporator 18. The heat transfer circuit 10 is exemplary and can be modified to include additional components. For example, in an embodiment the heat transfer circuit 10 can include an economizer heat exchanger, one or more flow control devices, a receiver tank, a dryer, a suction-liquid heat exchanger, or the like. In an embodiment, the heat transfer circuit 10 can include a plurality of compressors 12. In an embodiment, the plurality of compressors 12 can include compressors having different capacities.

It will be appreciated that the heat transfer circuit 10 can generally be applied in a variety of systems used, for example, to control an environmental condition (e.g., temperature, humidity, air quality, or the like) in a space (generally referred to as a conditioned space). Examples of systems include, but are not limited to, heating, ventilation, air conditioning and refrigeration (HVACR) systems, transport refrigeration systems, or the like.

The components of the heat transfer circuit 10 are fluidly connected. The heat transfer circuit 10 can be specifically configured to be a type of cooling system (e.g., fluid chiller) capable of operating in a cooling mode. Alternatively, the heat transfer circuit 10 can be specifically configured to be a heat pump system which can operate in both a cooling mode and a heating/defrost mode.

Heat transfer circuit 10 operates according to generally known principles. The heat transfer circuit 10 can be configured to use a heat transfer fluid or medium (e.g. working fluid) to heat or cool a process fluid or medium (e.g., a liquid such as, but not limited to, water or the like), in which case the heat transfer circuit 10, in an embodiment, may be generally representative of a fluid chiller system. The heat transfer circuit 10 can alternatively be configured to use a heat transfer fluid or medium (e.g. working fluid) to heat or cool a process medium or fluid (e.g., a gas such as, but not limited to, air or the like), in which case the heat transfer circuit 10 may be generally representative of an air conditioner or heat pump. In an example, the working fluid can be a refrigerant or refrigerant blend.

In operation, the compressor 12 compresses a heat transfer fluid or working fluid (e.g., refrigerant or the like) from a relatively lower pressure gas to a relatively higher-pressure gas. The relatively higher-pressure gas is discharged from the compressor 12 and flows through the condenser 14. In accordance with generally known principles, the heat transfer fluid flows through the condenser 14 and rejects heat to a heat transfer fluid or medium (e.g., water, air, etc.), thereby cooling the heat transfer fluid. The cooled heat transfer fluid, which is now in a liquid form, flows to the expansion device 16. The expansion device 16 reduces the pressure of the heat transfer fluid. As a result, a portion of the heat transfer fluid is converted to a gaseous form. The heat transfer fluid, which is now in a mixed liquid and gaseous form flows to the evaporator 18. The heat transfer fluid flows through the evaporator 18 and absorbs heat from a heat transfer medium (e.g., water, air, etc.), heating the heat transfer fluid, and converting it to a gaseous form. The gaseous heat transfer fluid then returns to the compressor 12. The above-described process continues while the heat transfer circuit is operating, for example, in a cooling mode (e.g., while the compressor 12 is enabled).

Embodiments disclosed herein generally relate to lubricant blends. In particular, compositions, methods, systems, and applications herein are directed to lubricant blends that balance solubility and viscosity of a refrigerant, where in some cases the lubricant blends herein help reduce solubility of a refrigerant.

Herein "solubility" means how much refrigerant is absorbed into the lubricant, where more refrigerant absorbed by the lubricant blend means a higher solubility and vice versa.

Herein, "miscibility" means the temperature at which there is a two phase fluid present, where above a certain critical solution temperature a single phase fluid may be maintained, and where below this certain critical solution temperature a two phase fluid would be present.

Herein, a lubricant blend's solubility, in particular if it has a higher solubility, and also its miscibility, can impact the lubricant blend's overall viscosity. The lubricity (e.g. lubrication quality) can be impacted when the viscosity is too low, for example through insufficient bearing film thickness in the compressor which can lead to system wear, reduced system life, and/or system failure. Too high of viscosity can impact efficiency of the system through increased power consumption to move the fluid. Targeting a suitable resulting viscosity from lubricant blend can provide adequate viscosity to create an acceptable film when mixed with refrigerant, for example in a chiller system. That is, the solubility of the refrigerant is not detrimental to the viscosity to provide an acceptable bearing film thickness.

In an embodiment, bearing film thickness can be satisfied by a ratio of the viscosity of the lubricant. For example, the ratio is of the viscosity of a particular oil at the operating temperature relative to the required viscosity needed in the bearing application. This may be called the viscosity ratio (denoted by a "kappa"). In an embodiment, the ratio can be defined as a "kappa value". In an embodiment, the kappa value is at or about 2. In an embodiment, a kappa value is at least 2. In an embodiment, the kappa value may be as low as 1, but where in some circumstances such a low value is a minimum in order to prevent damage.

In an embodiment, a lubricant blend herein includes a mixture of two or more different types of lubricants to reduce refrigerant solubility, for example in comparison to a single lubricant of the same or similar viscosity grade, or to other lubricant blends that would not reduce the refrigerant solubility as the lubricant blends described herein.

In an embodiment, the lubricant blend is mixed with a refrigerant or refrigerant blend.

In an embodiment, the refrigerant or refrigerant blend is a relatively soluble refrigerant type when mixed with a single lubricant. In an embodiment, the refrigerant or refrigerant blend is a low pressure refrigerant type, which includes for example an olefin refrigerant type. In an embodiment, the refrigerant or refrigerant blend is a refrigerant type suitable for use in a chiller, for example a fluid chiller implemented with a centrifugal compressor.

In an embodiment, the refrigerant or refrigerant blend is a blend of two refrigerants.

In an embodiment, the refrigerant or refrigerant blend includes a first refrigerant at or about 60 to at or about 90 percent by weight and a second refrigerant at or about 10 to at or about 40 percent by weight.

In an embodiment, the refrigerant or refrigerant blend includes a first refrigerant at or about 70 to at or about 90 percent by weight and a second refrigerant at or about 10 to at or about 30 percent by weight.

In an embodiment, the refrigerant or refrigerant blend includes a first refrigerant at or about 80 to at or about 90 percent by weight and a second refrigerant at or about 10 to at or about 20 percent by weight.

In an embodiment, the refrigerant or refrigerant blend includes a first refrigerant at or about 75 percent by weight to at or about 85 percent by weight and a second refrigerant at or about 15 by weight to at or about 25 percent by weight.

In an embodiment, the refrigerant or refrigerant blend includes a first refrigerant at or about 75 percent by weight to at or about 80 percent by weight and a second refrigerant at or about 20 by weight to at or about 25 percent by weight.

In an embodiment, the refrigerant or refrigerant blend includes a first refrigerant at or about 70 percent by weight to at or about 85 percent by weight and a second refrigerant at or about 15 by weight to at or about 30 percent by weight.

In an embodiment, the refrigerant or refrigerant blend includes a first refrigerant at or about 70 percent by weight to at or about 80 percent by weight and a second refrigerant at or about 20 by weight to at or about 30 percent by weight.

In an embodiment, the refrigerant or refrigerant blend includes a first refrigerant at or about 65 percent by weight to at or about 85 percent by weight and a second refrigerant at or about 15 by weight to at or about 35 percent by weight.

In an embodiment, the refrigerant or refrigerant blend includes a first refrigerant at or about 65 percent by weight to at or about 80 percent by weight and a second refrigerant at or about 20 by weight to at or about 35 percent by weight.

In an embodiment, the lubricant blend includes at or about 80 to at or about 85 percent by weight of the first lubricant and at or about 15 to at about 20 percent by weight of the second lubricant.

In an embodiment, the lubricant blend includes at or about 85 to at or about 90 percent by weight of the first lubricant and at or about 10 to at or about 15 percent by weight of the second lubricant.

In an embodiment, the lubricant blend includes at or about 75 to at or about 80 percent by weight of the first lubricant and at or about 20 to at about 25 percent by weight of the second lubricant.

In an embodiment, the lubricant blend includes at or about 75 to at or about 90 percent by weight of the first lubricant and at or about 10 to at or about 25 percent by weight of the second lubricant.

In an embodiment, the lubricant blend includes at or about 65 to at or about 90 percent by weight of the first lubricant and at or about 10 to at or about 35 percent by weight of the second lubricant.

In an embodiment, the lubricant blend includes at or about 60 to at or about 75 percent by weight of the first lubricant and at or about 25 to at about 40 percent by weight of the second lubricant.

In an embodiment, the lubricant blend includes at or about 65 to at or about 75 percent by weight of the first lubricant and at or about 25 to at or about 35 percent by weight of the second lubricant.

In an embodiment, the lubricant blend includes at or about 60 to at or about 70 percent by weight of the first lubricant and at or about 30 to at about 40 percent by weight of the second lubricant.

In an embodiment, the lubricant blend includes at or about 65 to at or about 70 percent by weight of the first lubricant and at or about 30 to at about 35 percent by weight of the second lubricant.

In an embodiment, the lubricant blend includes at or about 60 to at or about 65 percent by weight of the first lubricant and at or about 35 to at or about 40 percent by weight of the second lubricant.

In an embodiment, the refrigerant or refrigerant blend includes for example, a blend of R1336mzz(Z) (i.e. cis-1,1,1,4,4,4-hexafluorobut-2-ene) as the first refrigerant and R1130(E) (i.e. trans-1,2-dichloroethylene) as the second refrigerant.

In an embodiment, the refrigerant is cis-1-chloro-2,3,3,3-tetrafluoropropene (R-1224yd(Z)). In an embodiment, the refrigerant blend includes cis-1-chloro-2,3,3,3-tetrafluoropropene (R-1224yd(Z)).

In an embodiment, reference to percentage by weight, for example, as it applies to a refrigerant blend that includes R1336mzz(Z) (i.e. cis-1,1,1,4,4,4-hexafluorobut-2-ene) as the first refrigerant and R1130(E) (i.e. trans-1,2-dichloroethylene) as the second refrigerant, can also mean herein a percentage by volume of each of the components and may include the percentages by weight described above for a refrigerant blend. Also described below are percentages by volume for refrigerants in a refrigerant blend.

In an embodiment, the lubricant blend includes a first lubricant and a second lubricant. In an embodiment, the first lubricant is a base lubricant present in relatively higher percentage by volume of the lubricant blend than the second lubricant. In an embodiment, the second lubricant is a blend lubricant added to the first lubricant and is present in a relatively lower percentage by volume of the lubricant blend than the first lubricant.

In an embodiment, the first lubricant has a higher viscosity than the second lubricant.

In an embodiment, the first lubricant has an International Standards Organization (ISO) viscosity for example at 40° C. of at or about 120 to at or about 220 cSt.

In an embodiment, the first lubricant has an International Standards Organization (ISO) viscosity for example at 40° C. of 170 centistoke (cSt), of about 170 cSt, or up to 170 cSt before being blended with the second lubricant. It is appreciated that the viscosity may change depending on the temperature, and may change +/−10%.

In an embodiment, the second lubricant has an International Standards Organization (ISO) viscosity for example at 40° C. of at or about 4 to at or about 30 cSt.

In an embodiment, the second lubricant has an International Standards Organization (ISO) viscosity for example at 40° C. of at or about 4 to at or about 20 cSt.

In an embodiment, the second lubricant has an International Standards Organization (ISO) viscosity for example at 40° C. of at or about 20 to at or about 30 cSt.

In an embodiment, the second lubricant has an International Standards Organization (ISO) viscosity for example at 40° C. of at or about 12 to at or about 30 cSt.

In an embodiment, the second lubricant has an International Standards Organization (ISO) viscosity for example at 40° C. of at or about 12 to at or about 20 cSt.

In an embodiment, the second lubricant has an International Standards Organization (ISO) viscosity for example at 40° C. of at or about 4 to at or about 12 cSt.

In an embodiment, the second lubricant has an ISO viscosity for example at 40° C. of at, about, or up to 4 to 5 cSt before being blended with the first lubricant.

In an embodiment, the lubricant blend has a resulting ISO viscosity for example at 40° C. of at or about 32 to at or about 120 cSt.

In an embodiment, lubricant blend has a resulting ISO viscosity for example at 40° C. of at or about 32 to at or about 70 cSt.

In an embodiment, lubricant blend has a resulting ISO viscosity for example at 40° C. of at or about 32 to at or about 80 cSt.

In an embodiment, lubricant blend has a resulting ISO viscosity for example at 40° C. of at or about 32 to at or about 90 cSt.

In an embodiment, lubricant blend has a resulting ISO viscosity for example at 40° C. of at or about 32 to at or about 75 cSt.

In an embodiment, lubricant blend has a resulting ISO viscosity for example at 40° C. of at or about 32 to at or about 85 cSt.

In an embodiment, lubricant blend has a resulting ISO viscosity for example at 40° C. of at or about 32 to at or about 73 cSt.

In an embodiment, lubricant blend has a resulting ISO viscosity for example at 40° C. of at or about 90 to at or about 120 cSt.

In an embodiment, lubricant blend has a resulting ISO viscosity for example at 40° C. of at or about 80 to at or about 120 cSt.

In an embodiment, lubricant blend has a resulting ISO viscosity for example at 40° C. of at or about 70 to at or about 120 cSt.

In an embodiment, lubricant blend has a resulting ISO viscosity for example at 40° C. of at or about 85 to at or about 120 cSt.

In an embodiment, lubricant blend has a resulting ISO viscosity for example at 40° C. of at or about 75 to at or about 120 cSt.

In an embodiment, lubricant blend has a resulting ISO viscosity for example at 40° C. of at or about 73 to at or about 120 cSt.

In an embodiment, lubricant blend has a resulting ISO viscosity for example at 40° C. of at or about 68 to at or about 120 cSt.

In an embodiment, lubricant blend has a resulting ISO viscosity for example at 40° C. of at or about 80 to at or about 90 cSt.

In an embodiment, lubricant blend has a resulting ISO viscosity for example at 40° C. of at or about 85 to at or about 90 cSt.

In an embodiment, lubricant blend has a resulting ISO viscosity for example at 40° C. of at or about 70 to at or about 90 cSt.

In an embodiment, lubricant blend has a resulting ISO viscosity for example at 40° C. of at or about 75 to at or about 90 cSt.

In an embodiment, lubricant blend has a resulting ISO viscosity for example at 40° C. of at or about 73 to at or about 90 cSt.

In an embodiment, lubricant blend has a resulting ISO viscosity for example at 40° C. of at or about 68 to at or about 90 cSt.

In an embodiment, lubricant blend has a resulting ISO viscosity for example at 40° C. of at or about 32 to at or about 90 cSt.

In an embodiment, lubricant blend has a resulting ISO viscosity for example at 40° C. of at or about 80 to at or about 85 cSt.

In an embodiment, lubricant blend has a resulting ISO viscosity for example at 40° C. of at or about 75 to at or about 85 cSt.

In an embodiment, lubricant blend has a resulting ISO viscosity for example at 40° C. of at or about 73 to at or about 85 cSt.

In an embodiment, lubricant blend has a resulting ISO viscosity for example at 40° C. of at or about 70 to at or about 85 cSt.

In an embodiment, lubricant blend has a resulting ISO viscosity for example at 40° C. of at or about 68 to at or about 85 cSt.

In an embodiment, lubricant blend has a resulting ISO viscosity for example at 40° C. of at or about 32 to at or about 85 cSt.

In an embodiment, lubricant blend has a resulting ISO viscosity for example at 40° C. of at or about 75 to at or about 80 cSt.

In an embodiment, lubricant blend has a resulting ISO viscosity for example at 40° C. of at or about 73 to at or about 80 cSt.

In an embodiment, lubricant blend has a resulting ISO viscosity for example at 40° C. of at or about 70 to at or about 80 cSt.

In an embodiment, lubricant blend has a resulting ISO viscosity for example at 40° C. of at or about 68 to at or about 80 cSt.

In an embodiment, lubricant blend has a resulting ISO viscosity for example at 40° C. of at or about 32 to at or about 80 cSt.

In an embodiment, lubricant blend has a resulting ISO viscosity for example at 40° C. of at or about 73 to at or about 75 cSt.

In an embodiment, lubricant blend has a resulting ISO viscosity for example at 40° C. of at or about 70 to at or about 75 cSt.

In an embodiment, lubricant blend has a resulting ISO viscosity for example at 40° C. of at or about 68 to at or about 75 cSt.

In an embodiment, lubricant blend has a resulting ISO viscosity for example at 40° C. of at or about 32 to at or about 75 cSt.

In an embodiment, the lubricant blend has a resulting ISO viscosity for example at 40° C. of at or about 60 to at or about 120 cSt.

In an embodiment, lubricant blend has a resulting ISO viscosity for example at 40° C. of at or about 70 to at or about 120 cSt.

In an embodiment, the lubricant blend has a resulting ISO viscosity for example at 40° C. of at or about 60 to at or about 70 cSt.

In an embodiment, lubricant blend has a resulting ISO viscosity for example at 40° C. of at or about 68 to at or about 70 cSt.

In an embodiment, lubricant blend has a resulting ISO viscosity for example at 40° C. of at or about 32 cSt. In an embodiment, the lubricant blend is used in a system implemented with rotary, screw, or scroll compressor.

In an embodiment, lubricant blend has a resulting ISO viscosity for example at 40° C. of at or about 68 cSt to at or about 73 cSt. In an embodiment, the lubricant blend is used in a system implemented with a centrifugal compressor, which may operate at variable speed.

In an embodiment, lubricant blend has a resulting ISO viscosity for example at 40° C. of at or about 120 cSt. In an embodiment, the lubricant blend is used in a system implemented in a variable speed application.

In an embodiment, the second lubricant reduces the solubility of the refrigerant or refrigerant blend when mixed with the lubricant blend.

In an embodiment, the lubricant blend includes one or more of POE, PVE, and PAG as the first lubricant and one or more of alkylbenzene (AB), polyalphaolefin (PAO), mineral oil, and estolide.

In an embodiment, the lubricant blend includes by volume of the lubricant blend at or about 60 to at or about 90 percent by volume of the first lubricant and at or about 10 to at or about 40 percent by volume of the second lubricant.

In an embodiment, the lubricant blend includes by volume of the lubricant blend at or about 60 to at or about 85 percent by volume of the first lubricant and at or about 15 to at or about 40 percent by volume of the second lubricant.

In an embodiment, the lubricant blend includes by volume of the lubricant blend at or about 60 to at or about 80 percent by volume of the first lubricant and at or about 20 to at or about 40 percent by volume of the second lubricant.

In an embodiment, the lubricant blend includes by volume of the lubricant blend at or about 60 to at or about 75 percent by volume of the first lubricant and at or about 25 to at or about 40 percent by volume of the second lubricant.

In an embodiment, the lubricant blend includes by volume of the lubricant blend at or about 60 to at or about 70 percent by volume of the first lubricant and at or about 30 to at or about 40 percent by volume of the second lubricant.

In an embodiment, the lubricant blend includes by volume of the lubricant blend at or about 60 to at or about 65 percent by volume of the first lubricant and at or about 35 to at or about 40 percent by volume of the second lubricant.

In an embodiment, the lubricant blend includes by volume of the lubricant blend at or about 65 to at or about 90 percent by volume of the first lubricant and at or about 10 to at or about 35 percent by volume of the second lubricant.

In an embodiment, the lubricant blend includes by volume of the lubricant blend at or about 65 to at or about 85 percent by volume of the first lubricant and at or about 15 to at or about 35 percent by volume of the second lubricant.

In an embodiment, the lubricant blend includes by volume of the lubricant blend at or about 65 to at or about 80 percent by volume of the first lubricant and at or about 20 to at or about 35 percent by volume of the second lubricant.

In an embodiment, the lubricant blend includes by volume of the lubricant blend at or about 65 to at or about 75 percent by volume of the first lubricant and at or about 25 to at or about 35 percent by volume of the second lubricant.

In an embodiment, the lubricant blend includes by volume of the lubricant blend at or about 65 to at or about 70 percent by volume of the first lubricant and at or about 30 to at or about 35 percent by volume of the second lubricant.

In an embodiment, the lubricant blend includes by volume of the lubricant blend at or about 70 to at or about 90 percent by volume of the first lubricant and at or about 10 to at or about 30 percent by volume of the second lubricant.

In an embodiment, the lubricant blend includes by volume of the lubricant blend at or about 70 to at or about 85 percent by volume of the first lubricant and at or about 15 to at or about 30 percent by volume of the second lubricant.

In an embodiment, the lubricant blend includes by volume of the lubricant blend at or about 70 to at or about 80 percent by volume of the first lubricant and at or about 20 to at or about 30 percent by volume of the second lubricant.

In an embodiment, the lubricant blend includes by volume of the lubricant blend at or about 70 to at or about 75 percent by volume of the first lubricant and at or about 25 to at or about 30 percent by volume of the second lubricant.

In an embodiment, the lubricant blend includes by volume of the lubricant blend at or about 75 to at or about 90 percent by volume of the first lubricant and at or about 10 to at or about 25 percent by volume of the second lubricant.

In an embodiment, the lubricant blend includes by volume of the lubricant blend at or about 75 to at or about 85 percent by volume of the first lubricant and at or about 15 to at or about 25 percent by volume of the second lubricant.

In an embodiment, the lubricant blend includes by volume of the lubricant blend at or about 75 to at or about 80 percent by volume of the first lubricant and at or about 20 to at or about 25 percent by volume of the second lubricant.

In an embodiment, the lubricant blend includes by volume of the lubricant blend at or about 80 to at or about 90 percent by volume of the first lubricant and at or about 10 to at or about 20 percent by volume of the second lubricant.

In an embodiment, the lubricant blend includes by volume of the lubricant blend at or about 80 to at or about 85 percent by volume of the first lubricant and at or about 15 to at or about 20 percent by volume of the second lubricant.

In an embodiment, the lubricant blend includes by volume of the lubricant blend at or about 85 to at or about 90 percent by volume of the first lubricant and at or about 10 to at or about 15 percent by volume of the second lubricant.

In an embodiment, the refrigerant or refrigerant blend includes by volume of the refrigerant or refrigerant blend at or about 60 to at or about 90 percent by volume of a first refrigerant and at or about 10 to at or about 40 percent by volume of a second refrigerant.

In an embodiment, the refrigerant or refrigerant blend includes by volume of the refrigerant or refrigerant blend at or about 60 to at or about 85 percent by volume of the first refrigerant and at or about 15 to at or about 40 percent by volume of the second refrigerant.

In an embodiment, the refrigerant or refrigerant blend includes by volume of the refrigerant or refrigerant blend at or about 60 to at or about 80 percent by volume of the first refrigerant and at or about 20 to at or about 40 percent by volume of the second refrigerant.

In an embodiment, the refrigerant or refrigerant blend includes by volume of the refrigerant or refrigerant blend at or about 60 to at or about 75 percent by volume of the first refrigerant and at or about 25 to at or about 40 percent by volume of the second refrigerant.

In an embodiment, the refrigerant or refrigerant blend includes by volume of the refrigerant or refrigerant blend at or about 60 to at or about 70 percent by volume of the first refrigerant and at or about 30 to at or about 40 percent by volume of the second refrigerant.

In an embodiment, the refrigerant or refrigerant blend includes by volume of the refrigerant or refrigerant blend at or about 60 to at or about 65 percent by volume of the first refrigerant and at or about 35 to at or about 40 percent by volume of the second refrigerant.

In an embodiment, the refrigerant or refrigerant blend includes by volume of the refrigerant or refrigerant blend at or about 65 to at or about 90 percent by volume of the first refrigerant and at or about 10 to at or about 35 percent by volume of the second refrigerant.

In an embodiment, the refrigerant or refrigerant blend includes by volume of the refrigerant or refrigerant blend at or about 65 to at or about 85 percent by volume of the first refrigerant and at or about 15 to at or about 35 percent by volume of the second refrigerant.

In an embodiment, the refrigerant or refrigerant blend includes by volume of the refrigerant or refrigerant blend at or about 65 to at or about 80 percent by volume of the first refrigerant and at or about 20 to at or about 35 percent by volume of the second refrigerant.

In an embodiment, the refrigerant or refrigerant blend includes by volume of the refrigerant or refrigerant blend at or about 65 to at or about 75 percent by volume of the first refrigerant and at or about 25 to at or about 35 percent by volume of the second refrigerant.

In an embodiment, the refrigerant or refrigerant blend includes by volume of the refrigerant or refrigerant blend at or about 65 to at or about 70 percent by volume of the first refrigerant and at or about 30 to at or about 35 percent by volume of the second refrigerant.

In an embodiment, the refrigerant or refrigerant blend includes by volume of the refrigerant or refrigerant blend at or about 70 to at or about 90 percent by volume of the first refrigerant and at or about 10 to at or about 30 percent by volume of the second refrigerant.

In an embodiment, the refrigerant or refrigerant blend includes by volume of the refrigerant or refrigerant blend at or about 70 to at or about 85 percent by volume of the first refrigerant and at or about 15 to at or about 30 percent by volume of the second refrigerant.

In an embodiment, the refrigerant or refrigerant blend includes by volume of the refrigerant or refrigerant blend at or about 70 to at or about 80 percent by volume of the first refrigerant and at or about 20 to at or about 30 percent by volume of the second refrigerant.

In an embodiment, the refrigerant or refrigerant blend includes by volume of the refrigerant or refrigerant blend at or about 70 to at or about 75 percent by volume of the first refrigerant and at or about 25 to at or about 30 percent by volume of the second refrigerant.

In an embodiment, the refrigerant or refrigerant blend includes by volume of the refrigerant or refrigerant blend at or about 75 to at or about 90 percent by volume of the first refrigerant and at or about 10 to at or about 25 percent by volume of the second refrigerant.

In an embodiment, the refrigerant or refrigerant blend includes by volume of the refrigerant or refrigerant blend at or about 75 to at or about 85 percent by volume of the first refrigerant and at or about 15 to at or about 25 percent by volume of the second refrigerant.

In an embodiment, the refrigerant or refrigerant blend includes by volume of the refrigerant or refrigerant blend at or about 75 to at or about 80 percent by volume of the first refrigerant and at or about 20 to at or about 25 percent by volume of the second refrigerant.

In an embodiment, the refrigerant or refrigerant blend includes by volume of the refrigerant or refrigerant blend at or about 80 to at or about 90 percent by volume of the first refrigerant and at or about 10 to at or about 20 percent by volume of the second refrigerant.

In an embodiment, the refrigerant or refrigerant blend includes by volume of the refrigerant or refrigerant blend at or about 80 to at or about 85 percent by volume of the first refrigerant and at or about 15 to at or about 20 percent by volume of the second refrigerant.

In an embodiment, the refrigerant or refrigerant blend includes by volume of the refrigerant or refrigerant blend at or about 85 to at or about 90 percent by volume of the first refrigerant and at or about 10 to at or about 15 percent by volume of the second refrigerant.

In an embodiment, the first lubricant is POE or PVE and the second lubricant is AB or mineral oil.

In an embodiment, the first lubricant is POE and the second lubricant is AB.

In an embodiment, reference to percentage by volume, for example, as it applies to a lubricant blend that includes POE or PVE as the first lubricant and AB or mineral oil as the second lubricant, can also mean percentage by weight of each of the components and may include the percentages by volume described above for a lubricant blend.

It will be appreciated that any of the lubricant blends described above may be combined with any of the refrigerant/refrigerant blends described above, for example to obtain a desired viscosity as described herein and also to obtain a desired solubility and miscibility.

In an embodiment, the amount of the first lubricant and the amount of the second lubricant may be selected based on factors including one or more of its miscibility, solubility with the refrigerant or refrigerant blend, and resulting viscosity, and combinations thereof. In an embodiment, the selection of the amount of the first and second lubricants is based on a balance of these factors.

In an embodiment, a POE includes but is not limited to for example a compound which may be derived from alcohols including pentaerythritol, trimethylolpropane, neopentyl glycol, and dipentaerythritol (or combinations), and carboxylic acids comprised of 4 to 10 carbons in linear or branched formation or mixed (both linear and branched).

In an embodiment, a PVE includes but is not limited to for example polymers that contain ether side chains comprised of 2-8 carbons.

In an embodiment, a PAG includes but is not limited to for example polymers derived from propylene oxide or a mixture of propylene oxide and ethylene oxide; PAGs may be uncapped, mono-end-capped, or double-end-capped.

In an embodiment, an AB includes but is not limited to for example alkylbenzenes which are branched, linear, or are combinations thereof.

In an embodiment, a PAO includes but is not limited to for example oligomers of linear alpha-olefins.

In an embodiment, a mineral oil (MO) includes but is not limited to for example paraffins, naphthenes, aromatics, nonhydrocarbons, or combinations thereof.

In an embodiment, systems which implement the lubricant blends herein and the refrigerant or refrigerant blends herein can include at or about three pounds (3 lbs.) charge of refrigerant for example per ton of system cooling capacity. In some single compressor systems, such as for example systems with a centrifugal compressor, the cooling capacity in tons can range from at or about 200 to at or about 1800 tons of cooling, which may be at or about 600 to at or about 5400 lbs. of refrigerant. In an embodiment, the lubricant blend charge can be at or about 75 lbs.

In an embodiment, the lubricant blend can include or be mixed with or without additives. In an embodiment, the additives can include one or more of dispersants, detergents, anti-wear additives, pressure agents, corrosion inhibitors, antioxidants, acid catchers, viscosity index improvers, pour point depressants, foaming agents, anti-foaming agents, or other like stabilizing or performance enhancing compounds.

In an embodiment, lubricant blends herein can generally serve as an alternative to relatively higher viscosity lubricants to minimize refrigerant solubility and consequent viscosity reductions.

In an embodiment, lubricant blends herein can improve system efficiency and can reduce or eliminate the need for additional hardware, such as for example lubricant separators, and can improve the sustainability of the lubricant.

Refrigerants used today and being developed as next generation refrigerants for stationary HVACR equipment are soluble in POE and PVE lubricants, for example in the range of 32 to 120 centistoke (cSt) viscosities, depending on the operation type of the HVACR equipment (e.g. variable or fixed speed operation, compressor type e.g., rotary, screw, centrifugal, and the like). However, refrigerants used today and newer developed refrigerants can potentially exhibit higher solubility and may be increasingly used in variable or high speed compressor product applications. Application of lubricant blends in HVACR compressors, as an alternative to historically used single lubricant types in higher viscosity grades, provides more flexibility in altering the refrigerant solubility characteristics due to the inherently different physical and chemical properties of different types of lubricants.

By lowering the refrigerant solubility, a lower lubricant viscosity grade could be effectively applied and would provide the following advantages: 1) higher system efficiency due to lower power consumption (e.g. in comparison to using a single lubricant type at a higher viscosity); 2) elimination of the need for additional hardware such as oil separators and heaters; and/or 3) improved sustainability of the lubricant (depending on the lubricant selected for mixing). For example, estolides and polyol esters (POEs) exhibit higher biodegradability as opposed to conventional mineral oil or alkylbenzene type oils for example as per the Organization for Economic Co-operation and Development (OECD) 301. Also, life cycle assessments have suggested lower greenhouse gas use.

Lubricant blends of interest include 1) polyol ester (POE) lubricants mixed with one or more lubricants of type alkylbenzene (AB), mineral oil, polyalphaolefin (PAO), polyalkylene glycol (PAG), polyvinyl ether (PVE), and estolide, or 2) polyvinyl ether mixed with one or more lubricants of type AB, mineral oil, PAO, PAG, POE, and estolide.

AB, mineral oil, PAO, and estolide are soluble in POE and PVE, but alone may have inadequate miscibility and/or solubility with hydrofluorocarbon and olefin refrigerants.

In an embodiment, the first lubricant is POE and/or PVE and the second lubricant is estolide.

Applications of the lubricant blends herein can include vapor compression systems that employ a centrifugal compressor, a screw compressor, a scroll compressor, or reciprocating compressor, which may be used in a fixed or variable speed operation. The lubricant blends herein may be mixed with a refrigerant or refrigerant blend, including two or more of saturated hydrofluorocarbon, unsaturated hydrofluorocarbon, saturated hydrofluorochlorocarbon, unsaturated hydrofluorochlorocarbon, hydrocarbon, fluorinated or nonfluorinated ether, carbon dioxide, and ammonia.

In an embodiment, such refrigerants can include but are not limited to at least one of or blends of 1,1-dichloro-2,2,2-trifluoroethane, 1,1,1,2-tetrafluoroethane, 1,1,1,3,3-pentafluoropropane, 1,1,2,2,3-pentafluoropropane, difluoromethane, 1,1-difluoroethane, 1-chloro-3,3,3-trifluoropropene (Z), 2-chloro-3,3,3-trifluoropropene, 1,1-dichloro-3,3,3-trifluoropropene, 2,3,3,3-tetrafluoropropene, 1,3,3,3-tetrafluoropropene (E), 1,3,3,3-tetrafluoropropene (Z), 1,2-dichloro-3,3,3-trifluoropropene (E), 1,2-dichloro-3,3,3-trifluoropropene (Z), 1,1,3-trichloro-3,3,3-trifluoropropene, 1,2-dichloroethylene (E), 1,2-dichloroethylene (Z), 1,1-dichloroethylene, 1,1,1,4,4,4-hexafluorobutene (Z), 1,1,1,4,4,4-hexafluorobutene (E), 1,1,1,2,3-pentafluoropropane, 1,1,1,3,3-pentafluoropropane, C2-C8 hydrocarbons, carbon dioxide, and ammonia, and combinations thereof.

EXAMPLE

Development of Lubricant Blend for the refrigerant blend of 75% by weight of R-1336mzz(Z)—a fluorinated molecule—and 25% by weight of R-1130(E)—a chlorinated molecule (hereafter "example refrigerant blend" or ER-10 in the Figures).

Table 1 shows a refrigerant blend comprised of approximately 75% by weight R-1336mzz(Z)—a fluorinated molecule—and approximately 25% by weight R-1130(E)—a chlorinated molecule. In the HVACR industry, chlorine-containing refrigerants such as R-11, R-12, and R-123 (all single-component refrigerants) are physically compatible or miscible with, and are typically applied with mineral oil lubricants. Although these refrigerants are miscible with other lubricant types, mineral oil lubricants have exhibited favorable commercial and performance characteristics that have sustained their selection and application. Mineral oil lubricants have been used in applications with R-123, a hydrochlorofluorocarbon (HCFC) refrigerant used in HVACR systems, in which the example refrigerant blend may be implemented. R-123 and other HCFC refrigerants are being or will be phased out of production and use per requirements of the Montreal Protocol and regulatory policies, and the example refrigerant blend is a proposed R-123 alternative.

TABLE 1

| Component | Purpose | Approximate Nominal Concentration |
| --- | --- | --- |
| R-1336mzz(Z) 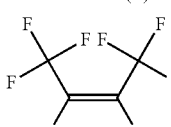 (2Z)-1,1,1,4,4,4-hexafluorobut-2-ene | Blend Component | 75% |
| R-1130(E) 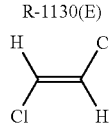 (E)-1,2-dichloroethene | Blend Component | 25% |

Figure 2:
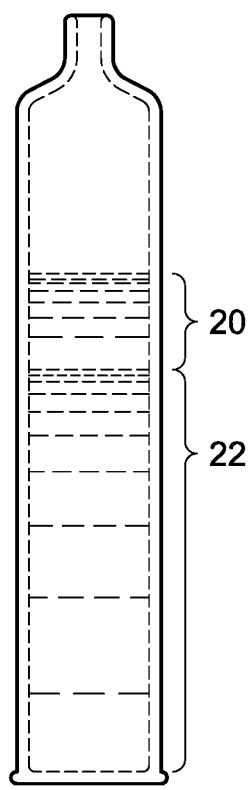
FIG. 2 is a a glass tube at ambient conditions (~20° C.) containing 95% of an example refrigerant blend and 5% mineral oil, where two separate phases formed.

During initial studies of the example refrigerant blend, the physical compatibility (miscibility) of a tested mineral oil and the example refrigerant blend was evaluated. As shown in FIG. 2, the example refrigerant blend had insufficient miscibility with the tested mineral oil, as two distinct phases—a "refrigerant-rich phase" 20 and a "lubricant-rich phase" 22—were formed at room temperature. For the intended applications, it may be desired that, in an embodiment, the refrigerant and lubricant maintain one single phase throughout the operating range and ambient temperature exposures. For example, such range includes at or about −12° C. to at or about 60° C. Thus, the tested mineral oil was ruled out as a viable single lubricant option for the example refrigerant blend. It will be appreciated that the tested mineral oil, or other mineral oils, may be used as a potential blend component in other lubricant blend selections.

FIG. 2 shows a glass tube at ambient conditions (~20° C.) containing 95% by weight of the example refrigerant blend and 5% by weight mineral oil. Two separate phases formed, demonstrating insufficient miscibility between the example refrigerant blend and mineral oil.

In general, hydrofluorocarbon (HFC) refrigerants that have no chlorine present in the molecules, such as R-134a, R-410A, and R-245fa, are not physically compatible with mineral oil lubricants and instead are applied with compatible synthetic lubricants such as polyol ester (POE) or polyvinyl ether (PVE). After the tested mineral oil was found to be physically incompatible with the example refrigerant blend, two commercially available synthetic lubricants (a POE and a PVE) were selected for further study. Miscibility studies were conducted with both of these lubricants and both maintained a single phase with the example refrigerant blend throughout the entire temperature range of interest.

Miscibility—Miscibility testing may be used as a screening tool during lubricant selection activities. If the miscibility is determined to be acceptable, then additional studies are conducted to evaluate the solubility and viscosity of the refrigerant/lubricant mixture. In general, sufficient miscibility of the lubricant with the refrigerant ensures proper oil return to the compressor and minimizes negative impact of a separate oil phase on other components of the system, for example heat exchanger devices in the system, while at the same time limited solubility of the refrigerant in the lubricant can avoid excessive lubricant viscosity reduction in the compressor.

Figure 3:
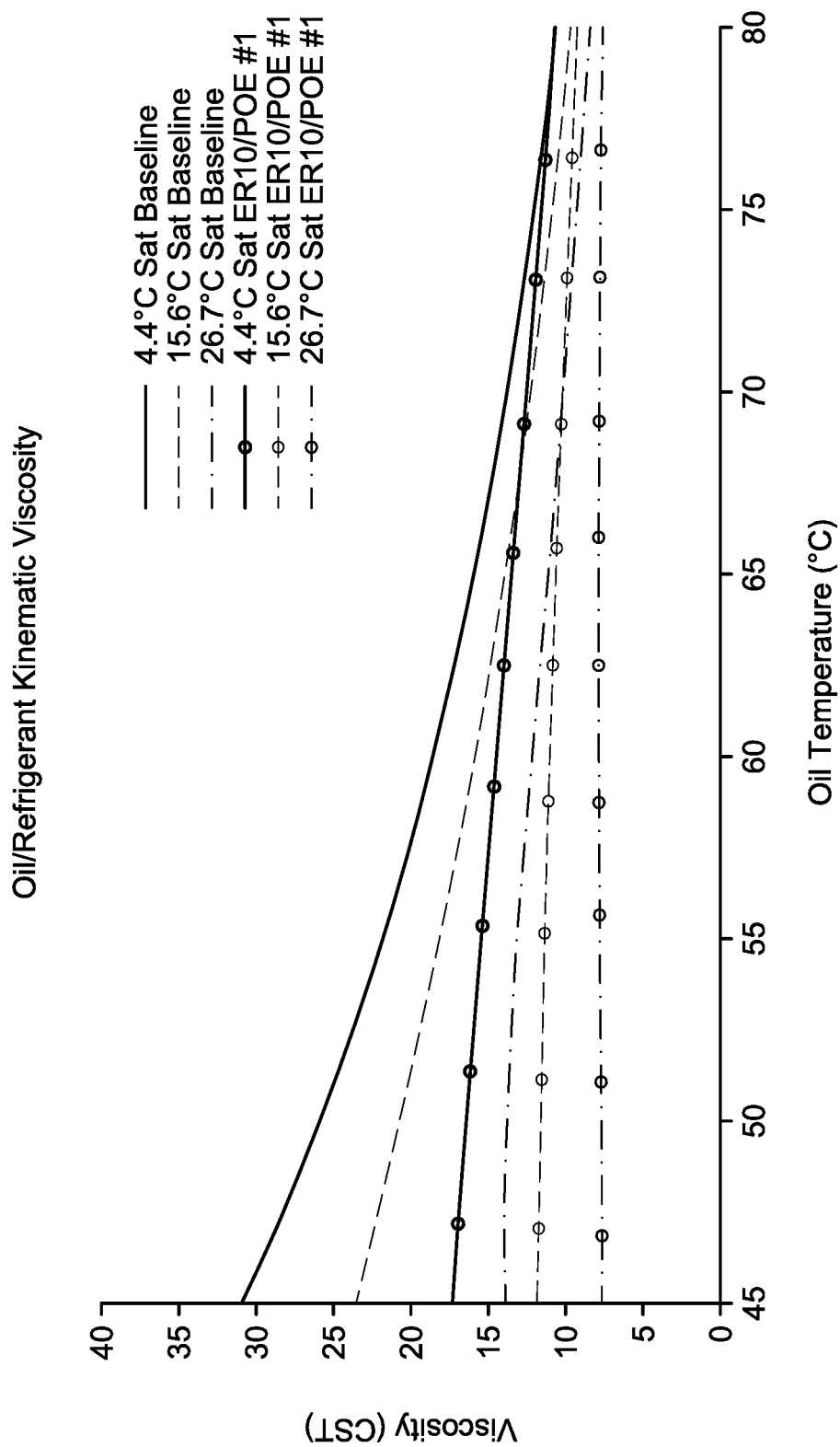
FIG. 3 is a pressure viscosity temperature chart showing a mixture viscosity of an example refrigerant blend with a lubricant (POE #1) is reduced relative to R-123/mineral oil due to higher refrigerant solubility of the example refrigerant blend in POE #1.
Figure 4:
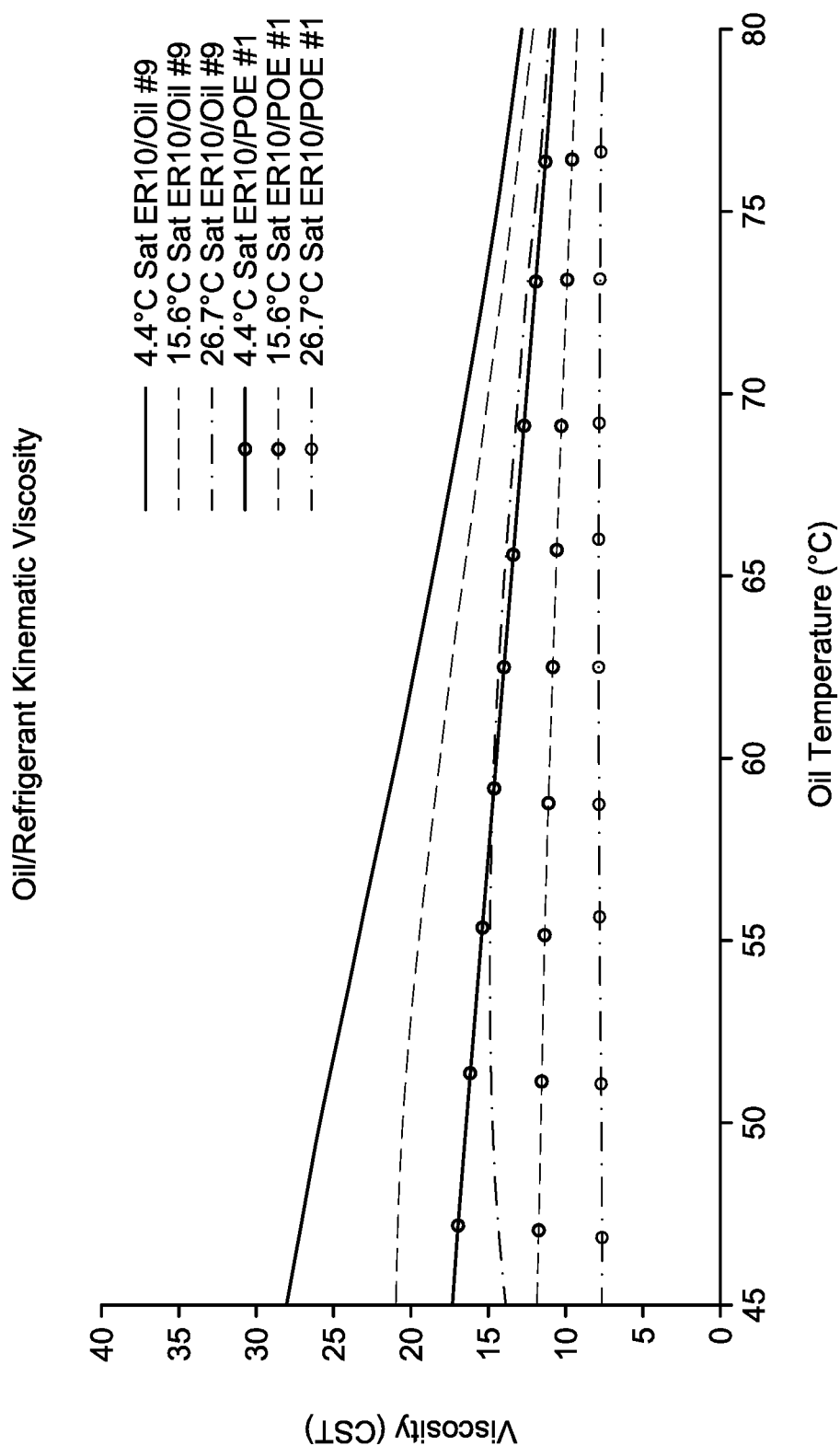
FIG. 4 is a pressure viscosity temperature chart showing a mixture viscosity of an example refrigerant blend with a lubricant blend herein where solubility is improved while desired miscibility is maintained.

Solubility and viscosity of a refrigerant/lubricant mixture are determined from plots shown in FIGS. 3 and 4, which are Pressure/Viscosity/Temperature (PVT) charts. Data from a new refrigerant/lubricant pair are compared to data for the current refrigerant/lubricant pair at similar conditions. The higher the solubility, or the more refrigerant that dissolves in the lubricant, the more the viscosity will be reduced. If the viscosity reduction is excessive, bearing reliability and compressor life can be negatively impacted.

With the example refrigerant blend/POE #1 mixture, refrigerant solubility was significantly increased in comparison to the mixture properties of R-123/mineral oil. Areas of the chiller operating map that had a solubility of 20% R-123 refrigerant in mineral oil would be exceeding 30% refrigerant solubility for the example refrigerant blend in POE #1 oil. At standard cooling conditions, refrigerant solubility that typically was around 4% with mineral oil would now exceed 10% with the example refrigerant blend/POE #1 mixture. Standard cooling conditions can include for example 40° F. or 4.4° C. In other examples, cooling conditions can include specific conditions as designed by request e.g. at 60° F. or 15.6° C. and/or at 80° F. or 26.7° C.

Figure 6:
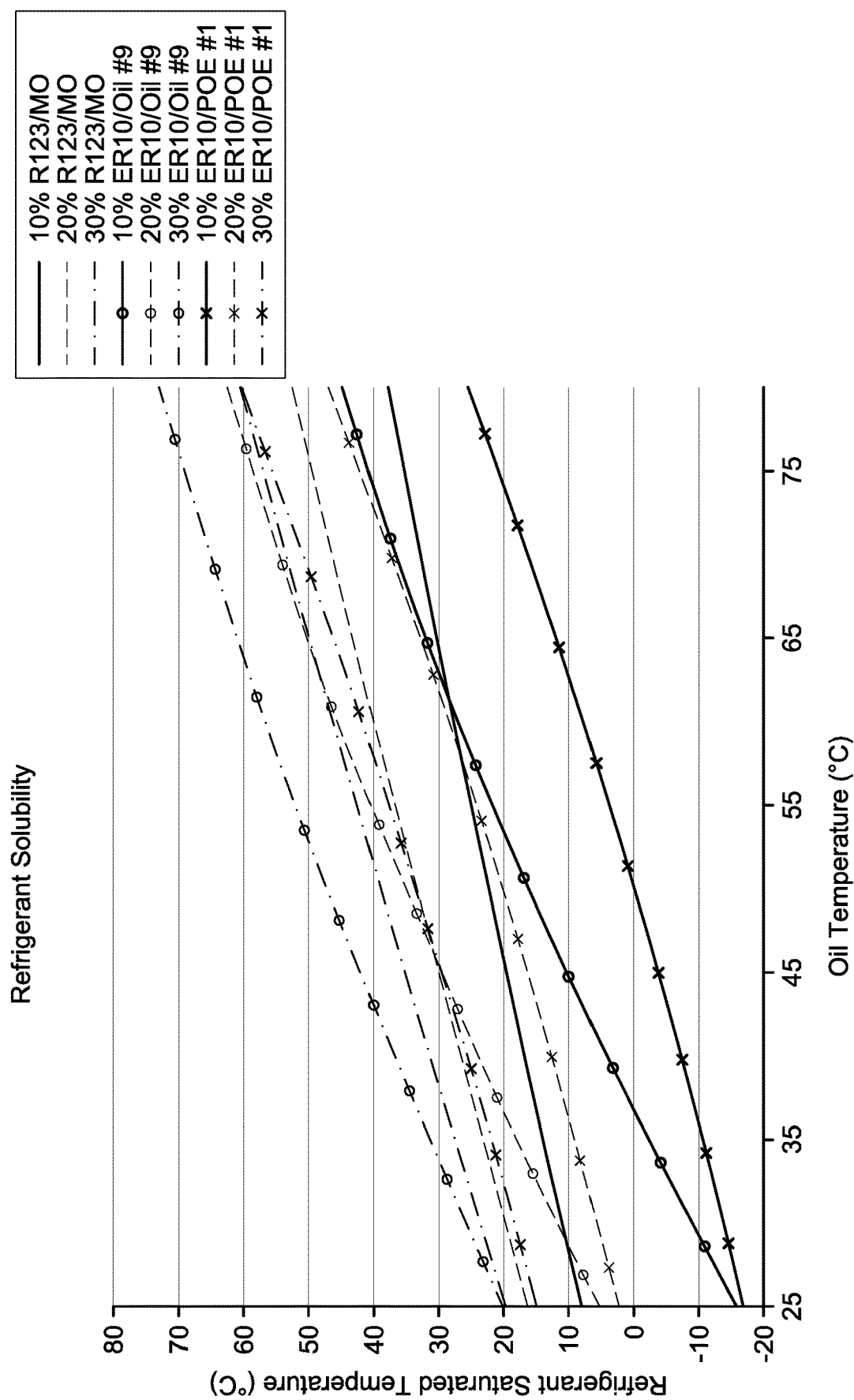
FIG. 6 is a chart showing refrigerant solubility of the example refrigerant blend with a lubricant blend herein in comparison to the example refrigerant blend with the POE #1 and relative to R123/mineral oil.

FIGS. 3 and 4 show viscosity relative to pressure and temperature. FIG. 6 shows solubility percentage with respect to temperature and pressure.

FIG. 6 is a chart showing refrigerant solubility of the example refrigerant blend with a lubricant blend herein in comparison to the example refrigerant blend with the POE #1 and relative to R123/mineral oil. The percentage solubility is shown as a function of increasing oil temperature and increasing refrigerant saturated temperature. Each line represents a percentage solubility of the refrigerant in the refrigerant/oil mixture dependent upon the oil temperature and refrigerant saturated temperature.

As shown in FIG. 3, a mixture viscosity of the example refrigerant blend/POE #1 is reduced relative to R-123/mineral oil due to higher refrigerant solubility of the example refrigerant blend in POE #1. FIG. 3 shows mixture viscosity comparisons for three different saturated refrigerant conditions.

Lower mixture viscosities in general are not detrimental for an application and in some scenarios are beneficial;

however, a certain mixture viscosity is desired to maintain a sufficient film thickness at the bearings. In FIG. 3, the mixture viscosity for the example refrigerant blend/POE #1 fell below minimum requirements in some conditions.

Lubricant blends compositions herein, including the example, can minimize lubrication system design changes, e.g. adding heaters to the oil tank to lower refrigerant concentrations, changing control set points to limit the chiller operating map, and/or adding oil separator technologies to separate the dissolved refrigerant from the lubricant.

Solubility, viscosity, and miscibility requirements were developed to guide the lubricant selection and development process, based off of successful application experiences with R-123 and mineral oil.

POE-based lubricants that exhibit low refrigerant solubility were evaluated. In an embodiment, the refrigerant is an HFC refrigerant type. Such POE lubricants were evaluated for whether lower solubility of the example refrigerant blend would be observed, while also maintaining a desired miscibility. Such POE-based lubricants may also be commercially available. A POE lubricant (POE #2) (with a relatively higher molecular weight) that was expected to have low solubility with the example refrigerant blend was tested. The results of the PVT chart demonstrated that POE #2 has favorable solubility improvements with the example refrigerant blend, but exhibited insufficient miscibility. As shown in Table 2, at the 10% by weight lubricant concentration (with 90% percent by weight of the example refrigerant blend), two phases were observed at 6° C., whereas the miscibility requirement was to maintain a single phase at or below −12° C. These results confirmed that although the refrigerant solubility was reduced with POE #2, the miscibility was also reduced. POE #2 did not meet the desired miscibility for the example refrigerant blend.

In an embodiment, reference to percent by weight of the lubricant and refrigerant can also mean percentage by volume of each of the lubricant blend and the refrigerant/refrigerant blend.

In an embodiment, the relative amount of each of the lubricant and the refrigerant may vary including at or about 5%, at or about 10%, at or about 20%, at or about 30%, and at or about 50%. In an embodiment, any of these percentages can appropriately make up a lower limit or upper limit. In an embodiment, the relative amount of lubricant and refrigerant can consider the type of system in which it is implemented, for example a HVACR system, such as but not limited to for example a fluid chiller, and which may use a certain compressor, for example but not limited to a centrifugal compressor.

TABLE 2

Miscibility Results for the example refrigerant blend and POE #2

| Temperature | | % Lubricant | |
|---|---|---|---|
| ° C. | ° F. | 50% | 10% |
| 60 | 140 | Clear, Single Phase | Clear, Single Phase |
| 40 | 104 | Clear, Single Phase | Clear, Single Phase |
| 20 | 68 | Clear, Single Phase | Clear, Single Phase |
| 15 | 59 | Clear, Single Phase | Clear, Single Phase |
| 14 | 57 | Clear, Single Phase | Clear, Single Phase |
| 13 | 55 | Clear, Single Phase | Clear, Single Phase |
| 12 | 54 | Clear, Single Phase | Clear, Single Phase |
| 11 | 52 | Clear, Single Phase | Clear, Single Phase |
| 10 | 50 | Clear, Single Phase | Clear, Single Phase |
| 9 | 48 | Clear, Single Phase | Clear, Single Phase |
| 8 | 46 | Clear, Single Phase | Clear, Single Phase |

TABLE 2-continued

Miscibility Results for the example refrigerant blend and POE #2

| Temperature | | % Lubricant | |
|---|---|---|---|
| ° C. | ° F. | 50% | 10% |
| 7 | 45 | Clear, Single Phase | Hazy, Single Phase |
| 6 | 43 | Clear, Single Phase | Hazy, Two Phases |
| 5 | 41 | Clear, Single Phase | Hazy, Two Phases |
| 0 | 32 | Clear, Single Phase | Hazy, Two Phases |
| −4 | 25 | Clear, Single Phase | Clear, Two Phases |
| −5 | 23 | Clear, Single Phase | Clear, Two Phases |
| −10 | 14 | Clear, Single Phase | Clear, Two Phases |
| −11 | 12 | Clear, Single Phase | Clear, Two Phases |
| −12 | 10 | Clear, Single Phase | Clear, Two Phases |
| −13 | 9 | Clear, Single Phase | Clear, Two Phases |
| −14 | 7 | Clear, Single Phase | Clear, Two Phases |
| −15 | 5 | Clear, Single Phase | Clear, Two Phases |
| −20 | −4 | Clear, Single Phase | Clear, Two Phases |

After the miscibility tests with POE #2 revealed that POE #2 did not have the desired miscibility, e.g. physical compatibility, with the example refrigerant blend in the temperature range of interest, two other commercially available low-solubility POEs (POE #3 and POE #4) were evaluated. The POE #3 and POE #4 were evaluated for whether suitable solubility reductions could be obtained, but that would also exhibit better miscibility performance than POE #2 had with the example refrigerant blend. Blends of other lubricant types with POE #3 and POE #4 were also evaluated as potential options to reduce or minimize the refrigerant solubility, while maintaining the miscibility and viscosity requirements.

Results of miscibility screening tests are shown in Table 3. Oil #7 and Oil #10 were observed to not have the desired miscibility with the example refrigerant blend, but the remaining blend options all met the desired miscibility. Oil #9 was selected for the further reported development. Oil #9 had favorable thermal and chemical stability.

TABLE 3

Miscibility Screening Test Results of POE and POE Blended Lubricants

| Lubricant Identifier | Composition | Critical Solution Temperature | |
|---|---|---|---|
| | | ° C. | ° F. |
| Oil #5 | POE #3/POE Blend (of lower relative viscosity) | −35 | −31 |
| Oil #6 | POE #3/AB Blend | −25 | −13 |
| Oil #7 | POE #3/PAO Blend | −5 | 23 |
| Oil #8 | POE #3/MO Blend | −20 | −4 |
| Oil #9 | POE #4/AB Blend | −20 | −4 |
| Oil #10 | POE #4/PAO Blend | −5 | 23 |
| Oil #11 | POE #4/MO Blend | −15 | 5 |

POE is polyol ester, AB is alkylbenzene, PAO is polyalphaolefin, and MO is mineral oil.

Table 3 shows an initial miscibility screening test done at one lubricant concentration (10% by weight) with 90% by weight of the example refrigerant blend. The lubricant blend (composition) included at or about 80% by volume of the identified POE and at or about 20% by volume of the second lubricant (e.g. AB, PAO, MO). Table 4 shows a more comprehensive miscibility test of the example refrigerant blend and Oil #9, which was conducted to observe whether the mixture remained in a single phase at or below −12° C. throughout a range of lubricant concentrations from 5% to 50% by weight of the mixture of the lubricant and the example refrigerant blend. As shown in Table 4, the 20% by weight lubricant sample exhibited immiscibility (two phases) at −15° C., whereas all the other concentrations maintained a single phase below −15° C. Thus, the desired miscibility was met.

TABLE 4

Miscibility Test Results of the example refrigerant blend and Oil #9

| Temperature | | % Lubricant | | | | |
|---|---|---|---|---|---|---|
| ° C. | ° F. | 5% | 10% | 20% | 30% | 50% |
| 60 | 140 | Clear, Single Phase | Clear, Single Phase | Clear, Single Phase | Clear, Single Phase | Clear, Single Phase |
| 50 | 122 | Clear, Single Phase | Clear, Single Phase | Clear, Single Phase | Clear, Single Phase | Clear, Single Phase |
| 40 | 104 | Clear, Single Phase | Clear, Single Phase | Clear, Single Phase | Clear, Single Phase | Clear, Single Phase |
| 30 | 86 | Clear, Single Phase | Clear, Single Phase | Clear, Single Phase | Clear, Single Phase | Clear, Single Phase |
| 20 | 68 | Clear, Single Phase | Clear, Single Phase | Clear, Single Phase | Clear, Single Phase | Clear, Single Phase |
| 10 | 50 | Clear, Single Phase | Clear, Single Phase | Clear, Single Phase | Clear, Single Phase | Clear, Single Phase |
| 0 | 32 | Clear, Single Phase | Clear, Single Phase | Clear, Single Phase | Clear, Single Phase | Clear, Single Phase |
| −5 | 23 | Clear, Single Phase | Clear, Single Phase | Clear, Single Phase | Clear, Single Phase | Clear, Single Phase |
| −10 | 14 | Clear, Single Phase | Clear, Single Phase | Clear, Single Phase | Clear, Single Phase | Clear, Single Phase |
| −11 | 12 | Clear, Single Phase | Clear, Single Phase | Clear, Single Phase | Clear, Single Phase | Clear, Single Phase |
| −12 | 10 | Clear, Single Phase | Clear, Single Phase | Clear, Single Phase | Clear, Single Phase | Clear, Single Phase |
| −13 | 9 | Clear, Single Phase | Clear, Single Phase | Hazy, Single Phase | Clear, Single Phase | Clear, Single Phase |
| −14 | 7 | Clear, Single Phase | Clear, Single Phase | Hazy, Single Phase | Clear, Single Phase | Clear, Single Phase |
| −15 | 5 | Clear, Single Phase | Clear, Single Phase | Hazy, Two Phases | Clear, Single Phase | Clear, Single Phase |
| −16 | 3 | Clear, Single Phase | Clear, Single Phase | Hazy, Two Phases | Hazy, Single Phase | Clear, Single Phase |
| −17 | 1 | Clear, Single Phase | Clear, Single Phase | Clear, Two Phases | Clear, Two Phases | Clear, Single Phase |
| −18 | 0 | Clear, Single Phase | Clear, Single Phase | Clear, Two Phases | Clear, Two Phases | Clear, Single Phase |
| −19 | −2 | Clear, Single Phase | Clear, Single Phase | Clear, Two Phases | Clear, Two Phases | Clear, Single Phase |
| −20 | −4 | Clear, Single Phase | Hazy, Two Phases | Clear, Two Phases | Clear, Two Phases | Clear, Single Phase |
| −21 | −6 | Clear, Single Phase | Hazy, Two Phases | Clear, Two Phases | Clear, Two Phases | Clear, Single Phase |
| −22 | −8 | Clear, Single Phase | Hazy, Two Phases | Clear, Two Phases | Clear, Two Phases | Clear, Single Phase |

PVT test results of the example refrigerant blend/Oil #9 showed a significant improvement in solubility characteristics over the example refrigerant blend with POE #1.

In addition, mixture viscosity of the example refrigerant blend/Oil #9 was an overall improvement in comparison to the example refrigerant blend/POE #1 (FIG. 3). The improvement can be attributed to the lower refrigerant solubility of the lubricant blend. See FIG. 4. FIG. 4 shows a plot of oil/refrigerant mixture viscosity, a comparison of the example refrigerant blend/POE #1 and relative to Oil #9.

The lubricant blends herein can provide the following advantages including but not limited to avoiding additional hardware, avoiding limiting the operating map in a new design or a retrofit system, e.g. R-123 systems; and providing a cost effective approach for a lubricant used in HVAC applications.

With further reference to miscibility, in particular the miscibility of the lubricant blends from the Example, in general, the lubricant blends herein would exhibit a desired miscibility with the refrigerant to ensure proper oil return to the compressor and minimize situations of separate fluid phases which may have a negative impact for example on heat exchanger devices in the system. The lubricant blends herein also have limited solubility of the refrigerant to avoid excessive lubricant viscosity reduction in the compressor.

Figure 5:
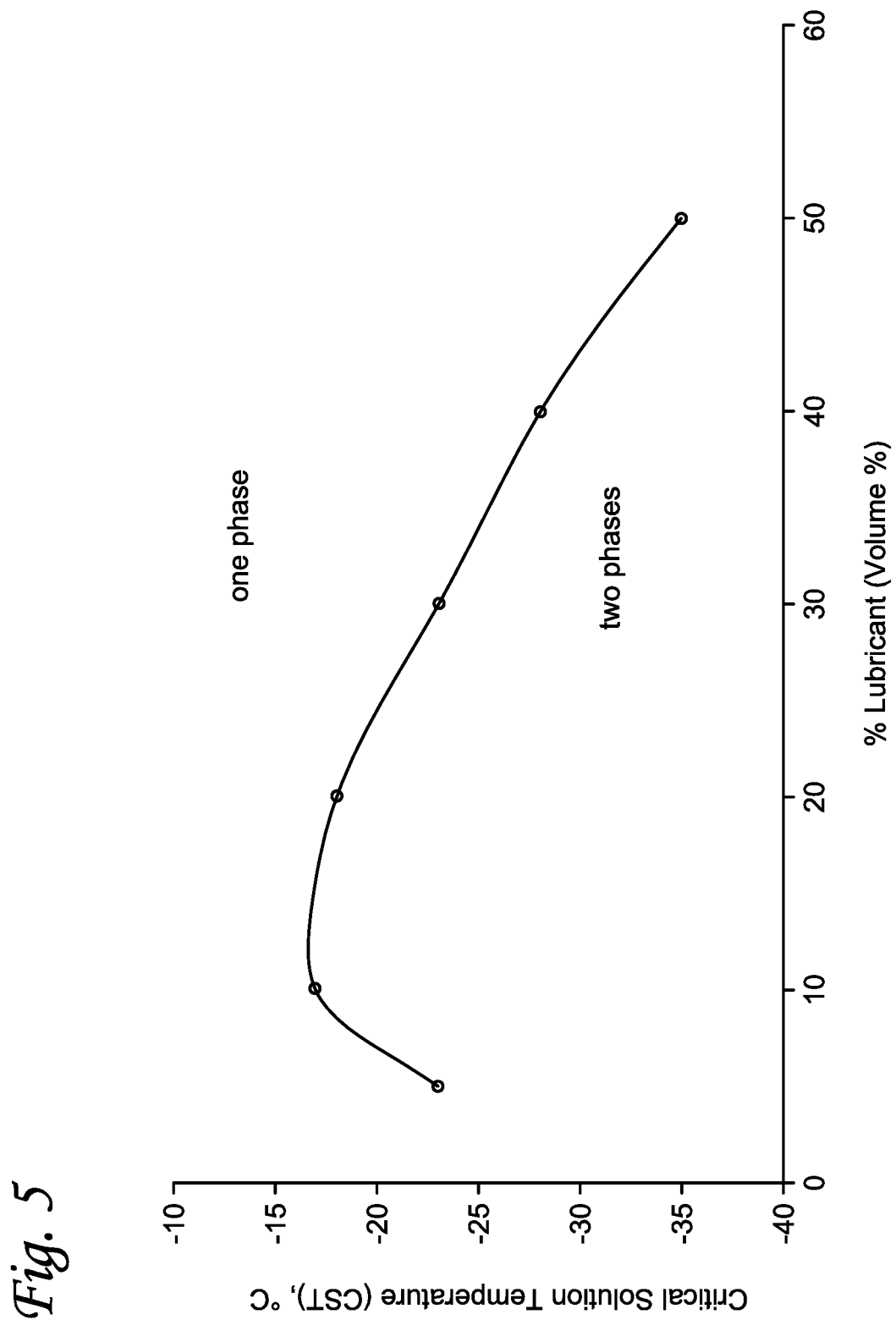
FIG. 5 is a chart showing the change of critical solution temperature (CST) as refrigerant and lubricant concentrations vary.

Generally refrigerant/lubricant solutions are partially miscible, or miscible to a limited extent depending on temperature and fluid concentrations. Above the critical solution temperature (CST) or consolute temperature, many refrigerant/lubricant mixtures are completely miscible (i.e., single phase). Below the CST, however, the liquid separates into two phases. This does not mean that the lubricant and refrigerant are insoluble in each other. The two liquid phases are solutions; one is lubricant-rich and the other refrigerant-rich (see e.g. FIG. 2). The CST changes as refrigerant and lubricant concentrations vary (see e.g. FIG. 5). Generally, desired miscibility can be set at the highest temperature and corresponding lubricant concentration at which two phases are observed. This temperature maximum is typically observed in the range between 5 and 25% lubricant by weight in the refrigerant and lubricant mixture.

For screening purposes, one or two lubricant concentrations were selected, such as 50% lubricant to represent in some circumstances the anticipated most miscible mixture and 10% to represent in some circumstances the least miscible mixture. Relative to the example refrigerant blend, the four POEs (i.e. POE #1 to POE #4) evaluated all maintained a single phase at 50% by weight lubricant, but their CST varied at the 10% by weight concentration.

| | Last Miscible Temperature (50% Lubricant) | | Last Miscible Temperature (10% Lubricant) | |
|---|---|---|---|---|
| Lubricant | ° C. | ° F. | ° C. | ° F. |
| POE #1 | <−20 | <−4 | <−20 | <−4 |
| POE #2 | <−20 | <−4 | 6 | 43 |
| POE #3 | <−20 | <−4 | <−20 | <−4 |
| POE #4 | <−20 | <−4 | −20 | −4 |

The CST for POE #2 was too high at the 10% lubricant concentration and did not meet the miscibility requirements. The low CSTs observed for POE #1 and POE #3 indicated that these two lubricants had excellent miscibility, but suggested that they may exhibit relatively high solubility, since miscibility and solubility generally trend together (e.g. high miscibility (or maintaining a single phase to a very low temperature) generally correlates to high refrigerant solubility). POE #4, exhibited lower but still acceptable miscibility relative to POE #1 and POE #3, and exhibited acceptable solubility when used as component in a lubricant blend (e.g. Oil #9).

Figure 7:
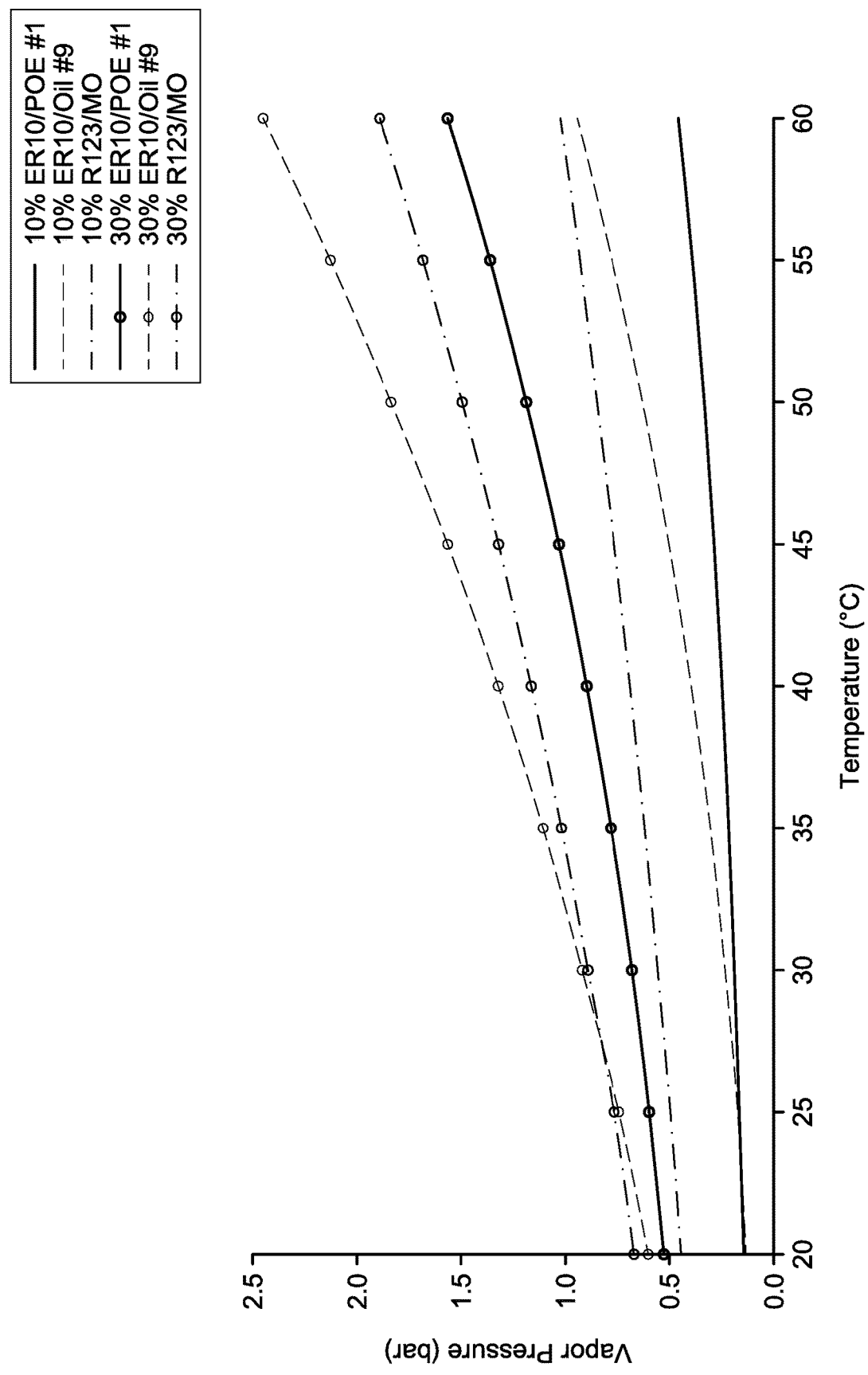
FIG. 7 is a chart showing refrigerant solubility of the example refrigerant blend with a lubricant blend herein in comparison to the example refrigerant blend with the POE #1 and relative to R123/mineral oil.

FIG. 7 is another chart showing refrigerant solubility of the example refrigerant blend with a lubricant blend herein in comparison to the example refrigerant blend with the POE #1 and relative to R123/mineral oil. In FIG. 7, a known percentage of refrigerant is mixed with the oil, and the solubility is indicated by the vapor pressure above the refrigerant/oil mixture. Assuming the refrigerants have similar pressures, which is the case here since ER-10 is a slightly lower pressure than R-123), the higher the vapor pressure, the less refrigerant that is dissolved in the oil (and thus lower solubility). The lower the vapor pressure, the more refrigerant that is dissolved in the oil and the less it is able to contribute to the vapor pressure. In general, for ER-10/POE 1, the vapor pressure is lower at the same conditions when compared to ER-10/Oil #9 and R-123/baseline MO.

Figure 8:
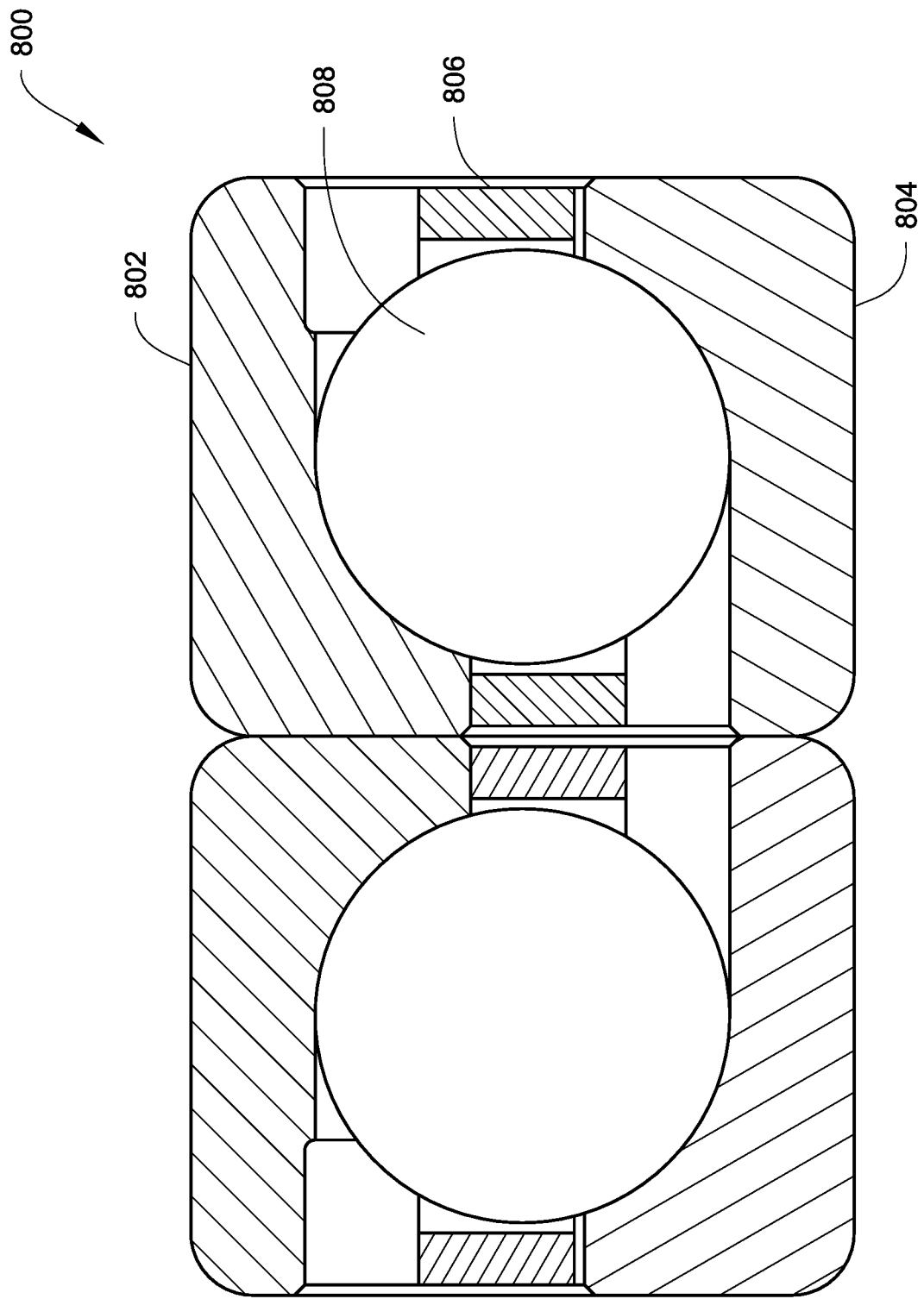
FIG. 8 shows side sectional view of an embodiment of a bearing, which may be employed in a compressor, for example in the system shown in FIG. 1.

FIG. 8 shows side sectional view of an embodiment of a bearing 800, which may be employed in a compressor, for example in the system shown in FIG. 1. The bearing 800 may be used in a motor of a compressor, such as for example in a centrifugal compressor. The bearing 800 has an outer race 802 and an inner race 804. In an embodiment, the inner race 804 and/or the outer race 802 may be made of steel, such as may be employed in standard bearing steels in such compressors. The bearing also includes a cage 806 which surrounds the rolling element 808. In an embodiment, the cage 806 may be made of composite material or polymer material. In an embodiment, the cage 806 may be made of polyether ether ketone (PEEK). In embodiment, the cage 806 may be made of brass. In an embodiment, the cage 806 may be made of riveted steel. In an embodiment, the rolling element 808 may be made of a silicon nitride ceramic material. The bearing 800 in an embodiment can be a heavy duty bearing made of such materials above and are suitable for use with the lubricant blends and refrigerant blends herein. The lubricant blends herein with the refrigerant blends herein have been observed to show excellent solubility and miscibility properties described herein which may be desired in such equipment using bearing 800, including for example in an HVAC and/or refrigeration unit implemented with a centrifugal compressor.

With regard to the foregoing description, it is to be understood that changes may be made in detail, without departing from the scope of the present invention. It is intended that the specification and depicted embodiments are to be considered exemplary only, with a true scope and spirit of the invention being indicated by the broad meaning of the aspects and claims.

Aspects

Any one or more of aspects 1 to 8 may be combined with any one or more of aspects 9 to 22, and any one or more of aspects 9 to 17 may be combined with any one or more of aspects 18 to 22, and any one or more of aspects 18 to 20 may be combined with any one or more of aspects 21 to 22, and aspect 21 may be combined with aspect 22.

Aspect 1. A lubricant blend composition, comprising:
two or more lubricants, the two or more lubricants including
a first lubricant; and
a second lubricant,
the first lubricant is present at a higher volume percentage than the second lubricant, the first lubricant includes a higher viscosity than the second lubricant, such that when blended with the second lubricant, the lubricant blend has a resulting viscosity when mixed with a refrigerant, and that exhibits a suitable miscibility and solubility within a desired operating range of a vapor compression system.

Aspect 2. The lubricant blend composition of Aspect 1, wherein the first lubricant includes one or more of POE, PVE, and PAG, and the second lubricant includes one or more of alkylbenzene (AB), polyalphaolefin (PAO), mineral oil, and estolide.

Aspect 3. The lubricant blend composition of Aspect 1 or 2, wherein the first lubricant is present at or about 60 to at or about 90 percent by volume of the lubricant blend, and the second lubricant is present at or about 10 to at or about 40 percent by volume of the lubricant blend.

Aspect 4. The lubricant blend composition of any of Aspects 1 to 3, wherein the first lubricant is present at or about 80 to at or about 90 percent by volume of the lubricant blend, and the second lubricant is present at or about 10 to at or about 20 percent by volume of the lubricant blend.

Aspect 5. The lubricant blend composition of any of Aspects 1 to 4, wherein the first lubricant is present at or about 80 to at or about 85 percent by volume of the lubricant blend, and the second lubricant is present at or about 15 to at or about 20 percent by volume of the lubricant blend.

Aspect 6. The lubricant blend composition of any of Aspects 1 to 5, wherein the first lubricant is present at or about 85 to at or about 90 percent by volume of the lubricant blend, and the second lubricant is present at or about 10 to at or about 15 percent by volume of the lubricant blend.

Aspect 7. The lubricant blend composition of any of Aspects 1 to 6, wherein the first lubricant is POE or PVE and the second lubricant is AB or mineral oil.

Aspect 8. The lubricant blend composition of any of Aspects 1 to 7, wherein the first lubricant is POE and the second lubricant is AB.

Aspect 9. A fluid for a vapor compression system, comprising
the lubricant blend of Aspect 1; and
a refrigerant.

Aspect 10. The fluid of Aspect 9, wherein the vapor compression system is a fluid chiller for an HVACR application.

Aspect 11. The fluid of Aspect 9 or 10, wherein the fluid chiller includes a centrifugal compressor.

Aspect 12. The fluid of any of Aspects 9 to 11, wherein the refrigerant is a refrigerant blend including two refrigerants.

Aspect 13. The fluid of any of Aspect 12, wherein the refrigerant blend includes a first refrigerant at or about 60 to at or about 90 percent by weight and a second refrigerant at or about 10 to at or about 40 percent by weight.

Aspect 14. The fluid of any of Aspects 12 or 13, wherein the refrigerant blend includes a first refrigerant at or about 70 to at or about 90 percent by weight and a second refrigerant at or about 10 to at or about 30 percent by weight.

Aspect 15. The fluid of any of Aspects 12 to 14, wherein the refrigerant blend includes a first refrigerant at or about 80 to at or about 90 percent by weight and a second refrigerant at or about 10 to at or about 20 percent by weight.

Aspect 16. The fluid of any of Aspects 12 to 15, wherein the refrigerant blend includes a first refrigerant at or about 75 to at or about 80 percent by weight and a second refrigerant at or about 20 to at or about 25 percent by weight.

Aspect 17. The fluid of any of Aspects 12 to 16, wherein the refrigerant blend includes a blend of R1336mzz(Z) as the first refrigerant and R1130(E) as the second refrigerant.

Aspect 18. A vapor compression system including
a compressor;
a condenser;
an evaporator;
an expansion device;
a refrigerant; and
the lubricant blend of Aspect 1 blended with the refrigerant.

Aspect 19. The vapor compression system of Aspect 18, wherein the vapor compression system is implemented as a fluid chiller for an HVACR application.

Aspect 20. The vapor compression system of Aspect 19, wherein the fluid chiller includes a centrifugal compressor.

Aspect 21. A method of retrofitting a vapor compression system, comprising:
removing an existing fluid in the vapor compression system, the existing fluid includes a refrigerant and lubricant mixture;
replacing the existing fluid in the vapor compression system with a replacement fluid, the replacement fluid includes a replacement refrigerant and the lubricant blend of Aspect 1; and
confirming an operating range of the vapor compression system with the replacement fluid.

Aspect 22. A method of reducing the solubility of a refrigerant in a lubricant blend, comprising:
selecting a refrigerant for application in a vapor compression system;
selecting the lubricant blend of Aspect 1 to be included as a mixture with the selected refrigerant;
confirming a miscibility of the lubricant blend and refrigerant when mixed together over a desired operating range of the vapor compression system;
confirming a viscosity of the lubricant blend and refrigerant when mixed together over the desired operating range of the vapor compression system.

The invention claimed is:

1. A lubricant blend composition, comprising:
a first lubricant that includes polyol ester (POE) and has an International Standards Organization (ISO) viscosity at 40° C. of at or about 120 to at or about 220 centistoke (cSt); and
a second lubricant that includes alkylbenzene (AB) and has an ISO viscosity at 40° C. of at or about 4 to at or about 30 cSt,
the first lubricant is present at a higher volume percentage than the second lubricant,
the lubricant blend composition has a resulting viscosity suitable for mixing with a refrigerant including at least one of or blends of 1,1-dichloro-2,2,2-trifluoroethane, 1,1,1,3,3-pentafluoropropane, 1,1,2,2,3-pentafluoropropane, 1,1-difluoroethane, 1-chloro-3,3,3-trifluoropropene (Z), 2-chloro-3,3,3-trifluoropropene, 1,1-dichloro-3,3,3-trifluoropropene, 2,3,3,3-tetrafluoropropene, 1,3,3,3-tetrafluoropropene (E), 1,3,3,3-tetrafluoropropene (Z), 1,2-dichloro-3,3,3-trifluoropropene (E), 1,2-dichloro-3,3,3-trifluoropropene (Z), 1,1,3-trichloro-3,3,3-trifluoropropene, 1,2-dichloroethylene (E), 1,2-dichloroethylene (Z), 1,1-dichloroethylene, 1,1,1,4,4,4-hexafluorobutene (Z), 1,1,1,4,4,4-hexafluorobutene (E), 1,1,1,2,3-pentafluoropropane, 1,1,1,3,3-pentafluoropropane, C2-C8 hydrocarbons, carbon dioxide, and ammonia, and
that exhibits a suitable miscibility and solubility in the refrigerant within a desired operating range of a vapor compression system.

2. The lubricant blend composition of claim 1, wherein the first lubricant is present at or about 60 to at or about 90 percent by volume of the lubricant blend composition, and the second lubricant is present at or about 10 to at or about 40 percent by volume of the lubricant blend composition.

3. The lubricant blend composition of claim 1, wherein the first lubricant is present at or about 80 to at or about 90 percent by volume of the lubricant blend composition, and the second lubricant is present at or about 10 to at or about 20 percent by volume of the lubricant blend composition.

4. The lubricant blend composition of claim 1, wherein the first lubricant is present at or about 80 to at or about 85 percent by volume of the lubricant blend composition, and the second lubricant is present at or about 15 to at or about 20 percent by volume of the lubricant blend composition.

5. The lubricant blend composition of claim 1, wherein the first lubricant is present at or about 85 to at or about 90 percent by volume of the lubricant blend composition, and the second lubricant is present at or about 10 to at or about 15 percent by volume of the lubricant blend composition.

6. A fluid for a vapor compression system, comprising
the lubricant blend composition of claim 1, wherein the refrigerant with which the lubricant blend composition is suitable for mixing is present; and
the refrigerant with which the lubricant blend composition is suitable for mixing is a refrigerant blend including 1,1,1,4,4,4-hexafluorobutene (Z) as a first refrigerant and 1,2-dichloroethylene (E) as a second refrigerant.

7. The fluid of claim 6, wherein the vapor compression system is a fluid chiller for a heating, ventilation, air conditioning, and refrigeration (HVACR) application, and the fluid chiller includes a centrifugal compressor.

8. The fluid of claim 6, wherein the refrigerant blend includes, by weight of the refrigerant blend, the first refrigerant at or about 60 to at or about 90 percent by weight and the second refrigerant at or about 10 to at or about 40 percent by weight.

9. The fluid of claim 6, wherein the refrigerant blend includes, by weight of the refrigerant blend, the first refrigerant at or about 70 to at or about 90 percent by weight and the second refrigerant at or about 10 to at or about 30 percent by weight.

10. The fluid of claim 6, wherein the refrigerant blend includes, by weight of the refrigerant blend, the first refrigerant at or about 80 to at or about 90 percent by weight and the second refrigerant at or about 10 to at or about 20 percent by weight.

11. The fluid of claim 6, wherein the refrigerant blend includes, by weight of the refrigerant blend, the first refrigerant at or about 75 to at or about 80 percent by weight and the second refrigerant at or about 20 to at or about 25 percent by weight.

12. A vapor compression system, including
a compressor;
a condenser;
an evaporator;
an expansion device; and
the lubricant blend composition of claim 1 which is blended with the refrigerant with which the lubricant blend composition is suitable for mixing.

13. The vapor compression system of claim 12, wherein the vapor compression system is implemented as a fluid chiller for a heating, ventilation, air conditioning, and refrigeration (HVACR) application.

14. The vapor compression system of claim 13, wherein the fluid chiller includes a centrifugal compressor.

15. A method of retrofitting a vapor compression system, comprising:
- removing an existing fluid in the vapor compression system, the existing fluid includes a refrigerant and lubricant mixture;
- replacing the existing fluid in the vapor compression system with a replacement fluid, the replacement fluid includes the lubricant blend composition of claim 1 and the refrigerant with which the lubricant blend composition is suitable for mixing; and
- confirming an operating range of the vapor compression system with the replacement fluid.

16. A method of reducing the solubility of a refrigerant in a lubricant blend, comprising:
- selecting the lubricant blend composition of claim 1 to be included as a mixture with a selected refrigerant of the refrigerant with which the lubricant blend composition is suitable for mixing;
- confirming a miscibility of the lubricant blend composition and the selected refrigerant when mixed together over a desired operating range of the vapor compression system;
- confirming a viscosity of the lubricant blend composition and the selected refrigerant when mixed together over the desired operating range of the vapor compression system.

* * * * *